INVENTORS.
DONALD R. PATTISON
ARTHUR H. PHILLIPS
BY
ATTORNEY.

INVENTORS.
DONALD R. PATTISON
ARTHUR H. PHILLIPS
BY Arthur H. Swanson
ATTORNEY.

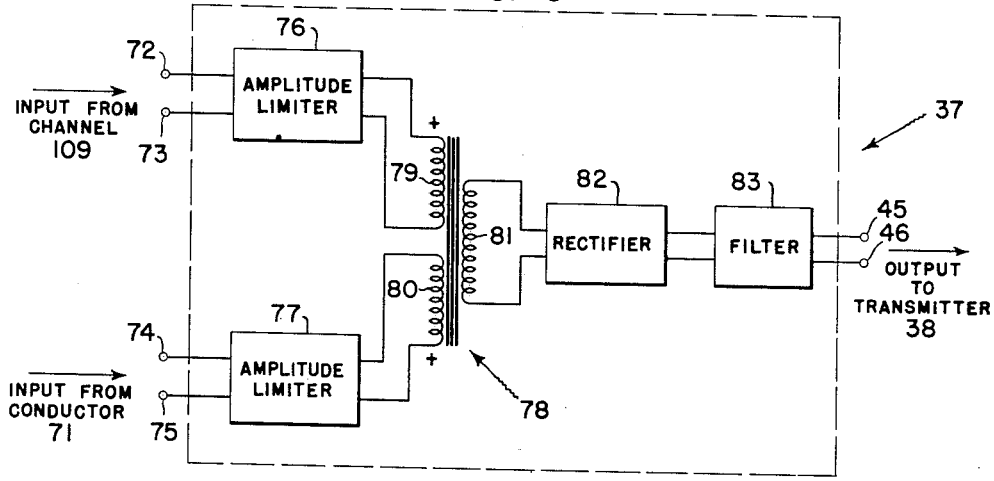
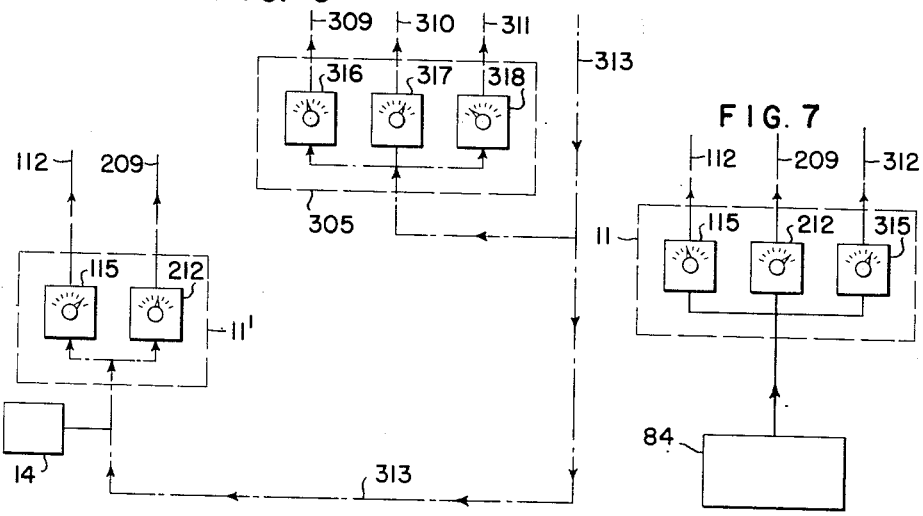
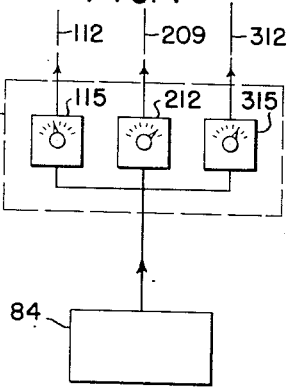
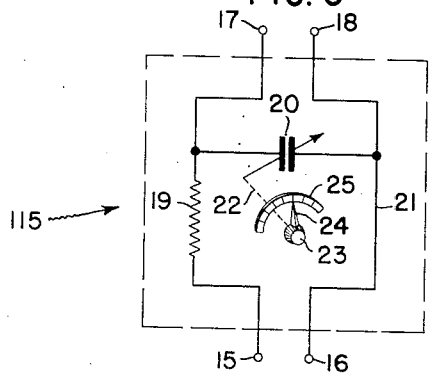

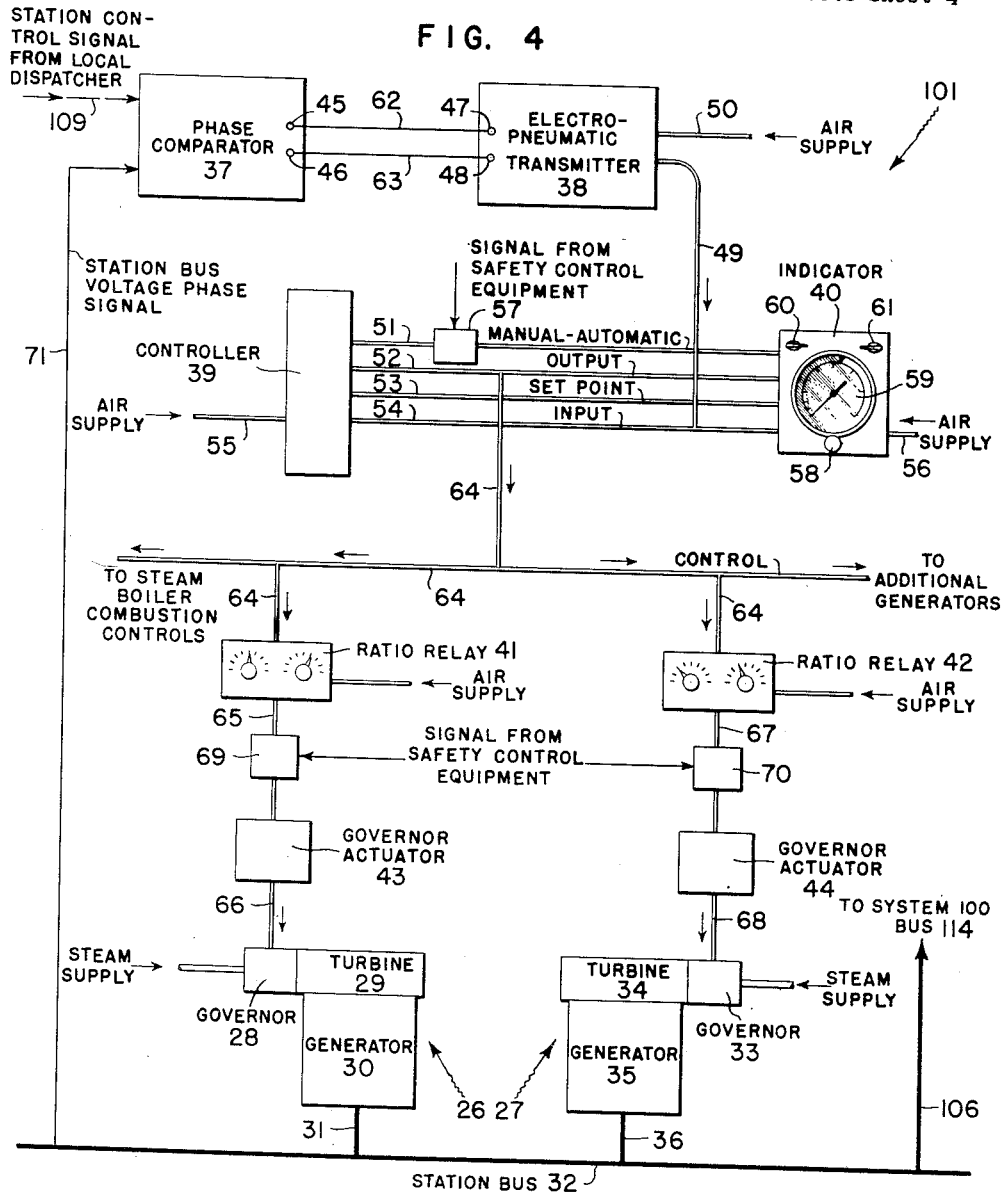

United States Patent Office 2,694,780
Patented Nov. 16, 1954

2,694,780

INTERCONNECTED GENERATING SYSTEMS CONTROL

Donald R. Pattison, Johnstown, and Arthur H. Phillips, Reading, Pa., assignors to Minneapolis-Honeywell Regulator Company, Minneapolis, Minn., a corporation of Delaware Application February 26, 1952, Serial No. 273,423

19 Claims. (Cl. 307—57)

The present invention relates broadly to the control of the flow of electrical energy or power between and within interconnected alternating current generating and distributing companies or systems, and to the control of frequency and time within such interconnected systems.

More specifically, the present invention relates to novel apparatus for effecting control actions of the general type specified above wherein the apparatus is operative to effect its controlling functions automatically through the medium of the differences between the phase angles of the various voltages present throughout the several interconnected systems or companies, and through the medium of the phase angles between these voltages and a reference signal or voltage.

The general object of the present invention is to provide an improved control apparatus for use in the control of the flows of electrical energy or power which take place between interconnected alternating current generating and distributing systems of companies, in the control of the flows of electrical energy or power which are present within the individual systems or companies so interconnected and in the control of frequency and time within the interconnected systems or companies. A specific object of the invention is to provide novel apparatus of the type just specified wherein the apparatus effects such control actions automatically through the medium of the relative phase angles of the various voltages which are present in the several interconnected systems or companies, and through the medium of the phase angles between these voltages and a reference signal or voltage.

A more specific object of the present invention is to provide novel control apparatus of the type designated above which is operative to control the magnitudes of the flows of electrical power between a plurality of predetermined generating points in the interconnected systems in terms of the phase angles between the voltages existing at the predetermined points. A still more specific object of the invention is to provide such control apparatus including means operative to derive a plurality of control signals from a reference signal, means operative to compare the phase of the voltage at each of said predetermined points with the phase of a corresponding one of said control signals, means operative to control or regulate the power generated at said points automatically as necessary to maintain the phase angles between the voltages at said points at desired, predetermined values, and means operative to combine a standard frequency signal with said reference signal to cause system frequency and time control to be effected simultaneously with the power control.

It is a further specific object of the invention to provide apparatus as just specified which includes a first plurality of adjustable phase shifting devices, each of which is individual to a corresponding one of the interconnected systems and is adapted to be adjusted by an inter-system dispatcher to a position corresponding to the desired value of the phase angle of the bus voltage of the particular system, and which includes a second plurality of adjustable phase shifting devices, each of which is individual to a corresponding one of the generating stations of the interconnected systems and is adapted to be adjusted by a local dispatcher to a position corresponding to the desired value of the phase angle of the bus voltage of the particular station.

An even more specific object of the invention is to provide novel control apparatus of the type specifier above wherein the reference signal or voltage, to the phase of which the phases of the other voltages are ultimately compared, is derived from the resultant of a plurality of voltages, each of which ha sa phase corresponding to that of the bus voltage of an individual one of the systems which are interconnected, and wherein there is added to this reference voltage the output signal of a source of standard frequency in order to effect the automatic control of frequency and time within the interconnected systems.

Other specific objects of the invention are to provide alternate forms of the apparatus just specified wherein said reference voltage is the bus voltage of but a single one of said systems or is the output voltage of the source of standard frequency alone.

Although it is known in the art that the voltage phase angle between two interconnected electrical power sources is a measure of the stability of the interconnection and is a measure of the power transfer between the sources under given conditions, and that such transfer can be accomplished with a high degree of operating efficiency when the voltage phase angle between the connected sources is made the operating criterion, we are the first, to the best of our knowledge, to utilize phase angle measurements as the basis for effecting automatic load control in a group of interconnected electrical power generating and distributing systems or companies, both for controlling automatically the various interchanges of electrical power between the individual systems and for controlling automatically the power outputs of the individual generating stations of the systems, and for simultaneously effecting automatic frequency and time control in the interconnected systems.

To this end, the present invention embodies the use of phase angle control signals which are transmitted from an intersystem dispatcher to the several system or company dispatchers of the interconnected systems, and which are transmitted from the several company dispatchers to the appropriate system generating stations, each of the control signals being representative of the phase angle which is to be maintained between the corresponding system or station bus voltage and a reference voltage. The automatic phase comparing and generator controlling equipment of the apparatus is then operative, under the control of these signals, to maintain the phases of the various bus voltages at the selected values with respect to one another and to the reference voltage phase, whereby appropriate magnitudes of transmitted, interchanged, and generated power flows commensurate with desired power transmission, interchanged, and generation conditions and efficiencies are automatically maintained. Also, the invention embodies the use of standard frequency and time comparison equipment which is operative to cause each of said control signals to be influenced by a standard frequency signal, whereby the automatic phase comparing and generator controlling equipment is additionally operative to regulate the generators as necessary to control time and frequency simultaneously with the control of power flows.

There are also known in the art numerous arrangements and equipments for effecting automatic, semi-automatic, and manual control of generator, transmission line, and tie line loads in interconnected electric power generating systems by making direct measurements of the actual power whose magnitude is to be controlled, and by controlling the flow of such power in accordance with its measured value. With all of these known arrangements, however, there lie several distinct and highly important and significant disadvantages, one of the most pronounced of which is probably the failure of such control arrangements to take into account intermediate, variable loads and generation located along an interconnection between points at which control is effected. Such a characteristic limits the efficiency with which such a line may be operated, and renders the interconnection subject to frequent separations and loss of synchronism when operated at values near the limits of stability.

Another disadvantageous characteristic of the known load control techniques presently employed is the requirement that interconnections must carry considerable amounts of synchronizing power at practically all times in order that synchronism be maintained between the interconnected generating facilities. Also, large amounts of synchronizing power must flow over interconnections during or after line fault clearing in order to reestablish synchronism between the interconnected facilities. Similarly, large synchronizing power flows over interconnections are necessarily present when switching in tie line circuits between previously isolated generating points. In each case, the capacities of the interconnections to carry useful power loads are seriously limited by the presence of such flows of synchronizing power.

Still another undesirable characteristic of the known load control arrangements stems from the fact that the usual power measurements in terms of watts which are made as a basis for the control effected do not take into account the var flow effects over the controlled lines. Accordingly, the operating efficiencies and useful power transfer capabilities of the interconnections are again seriously limited if operation is confined to regions well within the limits of operating stability in an effort to avoid system split-ups and losses of interconnection.

Again, the known load control arrangements being discussed are subject to the serious disadvantage that one of two parallel tie lines so controlled is often called upon by the control apparatus to carry an excessive load upon the opening of the other of the lines, due to a fault or other similar occurrence. This naturally causes the remaining line to be tripped open, with the result that the entire interconnection is interrupted and the tie between the previously connected points is completely lost.

In addition to the above, failure of a large generator, the sudden application of a large load, or the occurrence of some other unexpected disturbance within a group of interconnected systems operating under any of the presently employed forms of load control discussed above is usually accompanied by, or usually results in, the occurrence of sudden power surges and serious oscillations or inter-system swings within the interconnected and controlled systems. Such surges and oscillations are, of course, highly undesirable, since they are known to be conducive to the splitting up of the interconnected systems.

Finally, none of the present load control arrangements known to us is of such a nature as to permit automatic time and frequency control to be effected by the same devices and signals which simultaneously effect the load or power flow control in the interconnected systems being controlled.

As is well known by those concerned with and responsible for the operation of interconnected electric power generating and distributing systems, the above discussed disadvantages experienced with operation under the known forms of load control, together with other disadvantages not enumerated above but nevertheless of practical significance, have long created a need for an automatic control method and apparatus which would provide operation not subject to such undesirable characteristics. As the tendency toward interconnecting more and more generating facilities within systems and more and more systems across the country has increased and has resulted in the establishment of such interconnections, the need for such a new form of control has correspondingly increased.

Accordingly, it is a primary object of the present invention to provide novel load, frequency, and time control apparatus for interconnected systems which is not subject to the disadvantages and undesirable operating characteristics elaborated on above. Our novel phase angle control apparatus hereinbefore referred to complies fully with this requirement, since the operation of interconnected systems under the automatic control provided according to the present invention is completely free from the aforementioned undesirable characteristics of the prior control arrangements, and, indeed, is characterized by certain additional operating features of a highly desirable nature not obtainable with the prior control forms.

To this end, the novel phase angle control effected in accordance with our invention is operative to effect automatic power flow or load control and frequency and time control throughout a group of interconnected electrical power generating and distributing systems, which control is characterized by the following operating features:

The automatic control of power flow over interconnections to permit maximum transfers of power without exceeding the limits of stability or the capacities of the connections, even in the presence of variable and/or movable loads and generation therealong;

The automatic maintenance of synchronism between all of the generating facilities and between the individual systems at all times, whether physically connected or not, to minimize the flow of synchronizing power when operating under normal conditions and when switching to interconnect the facilities or systems;

The automatic maintenance of synchronism, as just specified, to prevent the flow of synchronizing power over parts of the interconnected group of systems during or after line fault clearing;

The automatic inclusion of var flow effects on wattage transfers in arriving at a basis for automatic control of total power flows;

The automatic control of generation so as to maintain desired phase angle and hence appropriate power flow relations between the various generating units and the several interconnected systems, thereby to prevent the tripping of one of two parallel tie lines upon opening of the other of the two lines, due to a fault or similar occurrence, and hence to prevent total loss of the interconnection;

The automatic control of the various interconnected generating units within their respective capacities, even in the presence of generator failures, suddenly applied loads, opening and closing of tie line circuits, or other unexpected disturbances, and without the occurrence of sudden power surges and oscillations or inter-system swings;

The automatic control of the generating units in each system, within their respective capacities and as far as is economically possible, as necessary to handle load swings occurring locally within the particular system;

The automatic maintenance at all times of desired phase angle relationships between the voltages of interconnected systems so as to establish and maintain appropriate power interchanges;

The reduction of the tendency to accumulate generator and load unbalance in the interconnected systems under control, thereby avoiding the undesirable inter-system swings which are usually produced by such accumulations;

The automatic control of the interconnected generator units and loads as necessary to cause tie lines to handle only the desirable load swings within the best economic limits of the available generation;

The automatic control of frequency and time within the interconnected systems by the operations of the devices and signals employed to effect simultaneously the control of power flows within the systems; and The provision of a maximum of automatic control with a minimum initial equipment cost, a minimum maintenance cost, and a maximum of reliability.

That the apparatus of the present invention provides operation characterized by the above enumerated operating features in effecting automatic control in interconnected systems will be clearly apparent from the detailed description of the present invention which is included herein.

In accordance with a preferred embodiment of the present invention, we effect the automatic control of the power flows in a group of interconnected electrical power generating systems or companies and their loads by sending a separate control signal from an inter-system dispatcher's location to the local dispatcher of each of the systems included in the interconnected group. The phase of each of these control signals is adjusted by the inter-system dispatcher to bear a desired relation to the phase of a reference voltage signal. These relations or resulting phase angles are the phase angles which it is desired to have maintained between the output bus voltages of the several systems and the reference voltage in order to establish desired phase angles between the output bus voltages of the several systems. Each of the last mentioned phase angles, in turn, bears a definite relationship to the magnitude of the flow of power between the corresponding systems under any given set of conditions.

From each of the local dispatchers' locations, a separate control signal is sent to each one of the generating stations included in the corresponding system. The phase of each of these control signals is adjusted by the corresponding local dispatcher to bear a desired relation to the phase of the control signal received by the local dispatcher from the inter-system dispatcher. These relations or resulting phase angles are the phase angles which it is desired to have maintained between the voltages of the busses of the several stations and the voltage of the output bus of the corresponding system in order to establish desired phase angles between the output bus voltages of the several stations. Each of the last mentioned phase angles, in turn, bears a definite relationship to the magnitude of the flow of power between the corresponding stations under any given set of conditions.

At each generating station, the phase of the received control signal is automatically compared with the phase of the station output bus voltage, and the several machines in the station are automatically regulated through adjustments to their individual governors or throttle valves as necessary to maintain zero phase difference between the control and output bus voltages. This results in each station's automatically supplying the appropriate portion of the total load for the corresponding system, and in the interchanges of appropriate loads between the several interconnected systems.

According to the present invention, the reference voltage signal supplied to the inter-system dispatcher may be the resultant of a plurality of voltages, each of which has a phase which corresponds to that of the output bus voltage of one of the several interconnected systems. A standard frequency signal, such as the output of a standard or fixed oscillator, is added to the reference signal just described in order to control system time and frequency by means of the control signals sent to the several generating stations. Thus, we utilize the standard frequency signal to modify the phase of the reference signal, and hence the phases of the control signals, as necessary to regulate the various station generators so that the system time is maintained equal to real time, and hence so that the system frequency is maintained essentially constant and equal to the frequency of the standard oscillator.

Alternately, the reference voltage signals may have the phase of the output bus voltage of but a single one of the systems, or may be the output of the standard oscillator alone. The various operating factors and existing conditions which must be taken into account in connection with each particular installation generally determine which type of reference voltage signal will be most applicable in the particular case.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described preferred embodiments of our invention.

Of the drawings:

Fig. 3 is a schematic representation of a preferred form of the phase shifting devices shown diagrammatically in Fig. 2;

Fig. 4 is a diagrammatic representation of a preferred form of the automatic control equipment of any one of the generating stations of Figs. 1 and 2;

Fig. 5 is a schematic representation of a preferred form of the phase comparing device shown in block form in Fig. 4;

Fig. 6 is a diagrammatic representation of a portion of a modification of the arrangement of Fig. 2 designed to employ a different type of reference signal; and Fig. 7 is a diagrammatic representation of a portion of another modification of the arrangement of Fig. 2 designed to employ a still different type of reference signal.

Figure 1:
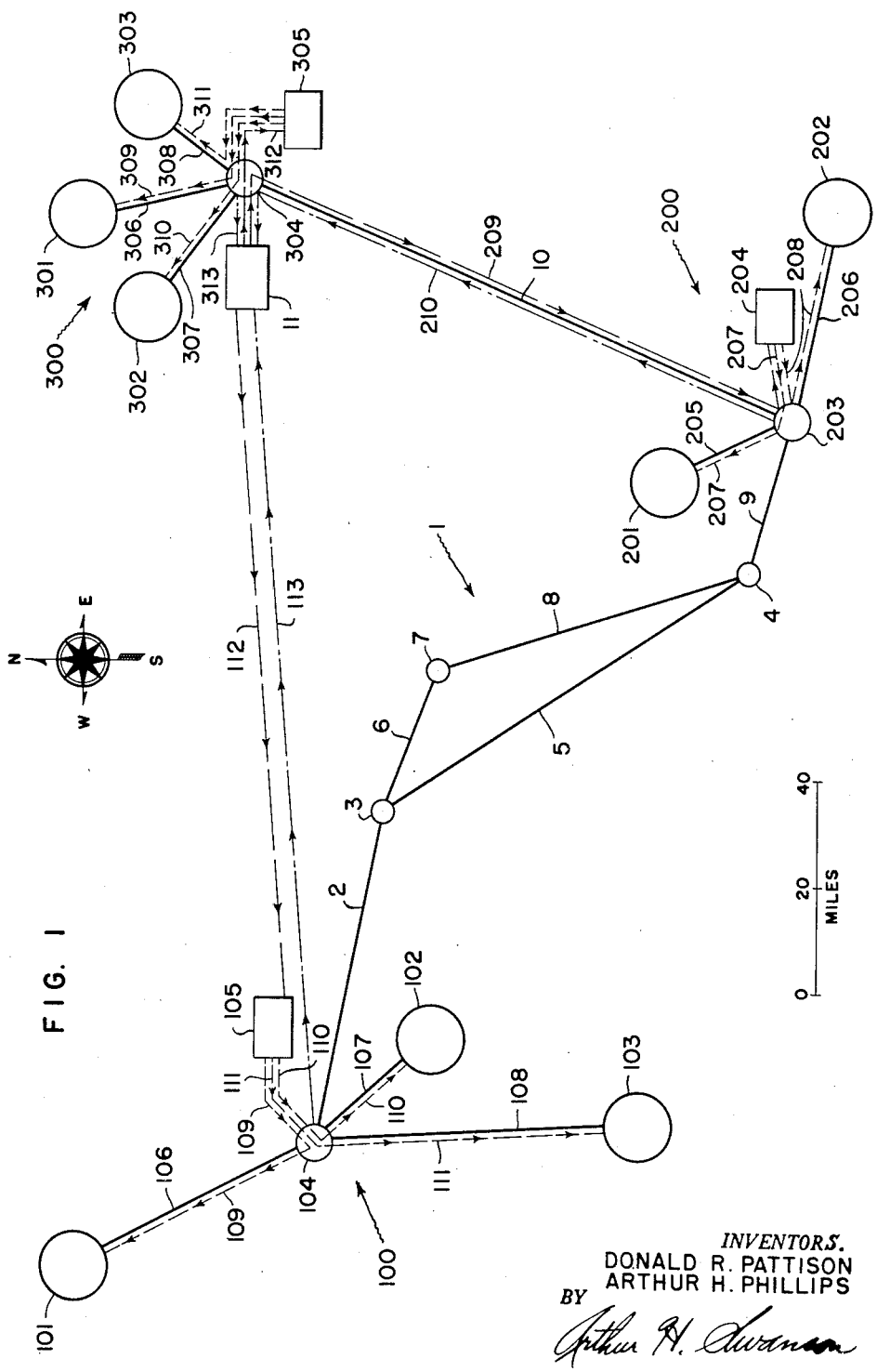
Fig. 1 is a diagrammatic, map-like representation of an application of the present invention to a typical group of interconnected electrical power generating and distributing systems.

The arrangement of Fig. 1

In Fig. 1, we have illustrated by way of example the application of a preferred form of our invention to a typical group of interconnected alternating current generating and distributing systems. The Fig. 1 arrangement is in the form of a plan view, and shows the relative physical or geographical relationships between the various basic units which make up the group of interconnected systems. Actually, Fig. 1 is of the nature of a map of the area in which the interconnected systems are located, the various units of the systems and the interconnections between these units being shown on the map in diagrammatic or symbolic form. It is to be understood, however, that the particular arrangement of Fig. 1 has been chosen solely for the purpose of illustrating the control apparatus of the present invention, and is not intentionally representative of any actual geographical location or any actual electrical systems or installations in existence.

The arrangement of Fig. 1 illustrates the use of the apparatus of the present invention in effecting the automatic control of three interconnected electrical power generating systems or companies and their loads. The arrangement chosen for illustration in Fig. 1 has been limited to the inclusion of but three such systems in order not to complicate the disclosure and description unduly. It should be noted, however, that the present invention is applicable to the control of any number of interconnected systems, and that the Fig. 1 arrangement may well represent but a small portion of a nationwide group of interconnected systems. For simplicity of explanation, however the following description will treat the arrangement of Fig. 1 as though the three illustrated systems or companies constitute the entire group of interconnected facilities which are under the automatic control effected by means of the present invention.

As shown in Fig. 1, the three interconnected electrical power generating and distributing systems or companies chosen to illustrate the present invention are somewhat widely separated over the terrain. The most westerly of the three systems, assumed herein to be operated by Company No. 1, has been generally designated by the reference character 100, and is seen to consist of three generating stations respectively indicated by the reference characters 101, 102, and 103. These stations are shown only diagrammatically and the circle representing each station is intended also to represent the immediate load served or supplied by the particular station. Thus, each of the stations 101, 102 and 103 may be assumed to be located in a separate town or city, the electrical load of which is normally supplied mainly by the local station.

The system 100 also includes an interconnection or junction point 104 which, in accordance with present practice, is herein assumed to be a substation which supplies the local load to the area surrounding it. This area may well represent a town or city, and has located therein, adjacent the substation 104, the office or station 105 of the local dispatcher for the system 100. Each of the generating stations 101, 102, and 103 is connected to the substation 104 by a respective one of three transmission or tie lines 106, 107, and 108. These lines are interconnected to the system or company bus at the substation 104, this bus being connected, in turn, to those of the remaining systems as will be described hereinafter.

The dispatcher's office 105 is connected to each of the stations 101, 102, and 103 by a separate, corresponding one of three communication channels 109, 110, and 111. These channels are shown by short dashed lines in Fig. 1, and are assumed herein to be carrier current channels which are operative to permit each of the station phase angle control signals of the present invention to be transmitted from the local dispatcher's office over the corresponding tie line to the corresponding generating station. The purpose of these station control signals and the manner in which they are employed in accordance with the present invention will be described in detail hereinafter.

As shown, the three channels 109, 110, and 111 pass through the substation 104 and thus link together all of the units or components of the system 100. The carrier current channels 109, 110, and 111, as well as those to be subsequently described, are herein assumed to be of the type which continue to function, by means of suitable by-pass devices, when the lines over which they operate are opened by switching or similar actions.

The term "communication channel" is used herein to define a transmission path for control signals as distinguished from a transmission path for the power generated by the various stations.

Accordingly, the use of this term is not intended to imply that the paths or circuits so named are used for communication purposes in the usual sense: i. e., for permitting verbal instructions to pass between load dispatchers, generating station operators, etc.

The most southerly of the systems of Fig. 1, assumed herein to be operated by Company No. 2, has been generally designated by the reference character 200, and is seen to consist of two generating stations 201 and 202. As in the case of system 100, the circles representing the generating stations 201 and 202 are intended also to represent the immediate loads served by the corresponding stations and originating in the cities or towns in which the stations are located.

The system 200 also includes an interconnecting substation and its immediate load, designated by the reference character 203, a local dispatcher's office 204, and lines 205 and 206 which respectively connect the stations 201 and 202 to the system bus at the substation 203. The local dispatcher's office 204 is connected to each of the stations 201 and 202, by way of the substation 203, by a separate, corresponding one of two communication channels 207 and 208, shown by short dashed lines in Fig. 1. Each of these channels is assumed herein to be a carrier current channel of the same type as the channels 109, 110, and 111, and serves the same purpose with respect to the system 200 as the channels 109, 110, and 111 serve with respect to the system 100.

The most easterly of the systems of Fig. 1, assumed herein to be operated by Company No. 3, has been generally designated by the reference character 300, and is seen to include three generating stations 301, 302, and 303. As in the case of the systems 100 and 200, the circles representing the generating stations of the system 300 are intended also to represent the immediate loads served by the corresponding stations and originating in the areas in which the stations are located.

Also included in the system 300 is an interconnecting substation and its immediate load, designated by the reference character 304, a local dispatcher's office 305, and lines 306, 307, and 308 which respectively connect the stations 301, 302, and 303 to the bus of the system 300 at the substation 304. The local dispatcher's office 305 is connected to each of the stations 301, 302, and 303, by way of the substation 304, by a separate, corresponding one of three communication channels 309, 310, and 311, shown by short dashed lines in Fig. 1. Each of the latter is assumed herein to be a carrier current channel of the same type as those of the systems 100 and 200, and serves the same purpose with respect to the system 300 as is served by the aforementioned channels of the systems 100 and 200 with respect to the latter.

The systems 100 and 200 of Fig. 1 are shown as being interconnected by a tie line generally designated by the reference character 1. The line 1 has a single portion 2 running from the substation 104 to a junction or interconnection point or substation 3. From the latter, a double portion of the line 1 extends to a junction point or substation 4. This double line portion consists of a single line 5 directly connecting the substations 3 and 4, and a single line 6 connecting the substation 3 to a junction point or substation 7, the latter being connected to the substation 4 by a single line 8. Accordingly, the substations 3 and 4 are connected by two, electrically parallel, tie lines. The remainder of the line 1 consists of a single portion 9 which connects the substation 4 to the substation 203 of the system 200.

The circles employed to designate the substations 3, 4, and 7 are intended to designate also the immediate loads served by the corresponding substations. Thus, each of the substations 3, 4, and 7 may be located in a town or city whose load is supplied by the corresponding substation. In addition, the loads supplied by one or more of the last mentioned substations may be railway loads having variable demands along the tie lines between the substations.

A single tie line 10 is shown as being connected between the substations 203 and 304 for the purpose of interconnecting the systems 200 and 300. Although no loads have been shown located along the line 10, it is contemplated that there may be various loads of fixed or variable position along the line 10.

The entire group of interconnected stations shown in Fig. 1 is under the control of an inter-system or area dispatcher's office or station 11. The latter is shown as being located in the general area served by the system 300, and is connected by a separate communication channel to each of the local dispatchers' offices. These channels are shown by long dashed lines in Fig. 1. Thus, a channel 112, herein assumed to be a microwave channel, connects the inter-system dispatcher's office 11 to the local dispatcher's office 105 of the system 100. Similarly, a carrier current channel 209 is shown connecting the inter-system dispatcher's office 11 to the local dispatcher's office 204 of the system 200 by way of the substation 203. Finally, a channel 312, herein assumed to be a telephone line channel, connects the inter-system dispatcher's office 11 to the local dispatcher's office 305 of the system 300.

Each of the three channels 112, 209, and 312 is operative to permit the inter-system dispatcher to transmit system phase angle control signals to the corresponding local dispatcher in accordance with the present invention as will be described hereinafter.

A separate communication channel is also provided between each of the system busses at the substations 104, 203, and 304 and the inter-system dispatcher's office 11. These channels are shown by dot-dash lines in Fig. 1. To this end, a channel 113, herein assumed to be a microwave channel, connects the bus of the system 100 at the substation 104 to the office 11. Additionally, a carrier current channel 210 connects the bus of the system 200 at the substation 203 to the office 11. Finally, a telephone line channel 313 connects the bus of the system 300 at the substation 304 to the office 11. Each of the channels 113, 210, and 313 is operative to transmit an appropriate reference signal from the corresponding system bus to the inter-system dispatcher's office 11 for the purpose of establishing a resultant reference signal at the office 11 as will be hereinafter described.

Although specific forms have been chosen for the various communication channels, described above, for the purpose of illustrating the operation of the present invention, it is to be understood that each of the described channels may be in the form of a carrier current, a microwave, or a telephone line channel, whichever is the most suitable under the prevailing conditions. Also, it may be advantageous in some cases to employ two or more different channel forms along different portions of a single channel. Again, other forms of communication may be found suitable for use in lieu of or in combination with those illustrated herein for use as the described communication channels.

It should also be noted that additional interconnecting tie lines could exist between the various generating stations, substations, and systems of Fig. 1 without changing the basic operation of the present invention in effecting automatic control of electrical power flows throughout the systems. Further, additional loads of fixed or variable position, and even additional generating facilities with variable points of application, such as occur from being connected to a railway employing regenerative braking, can exist in the illustrated arrangement of Fig. 1 without disturbing said basic operation. In each case, the effects of additional tie lines, loads, and/or generating facilities will automatically be taken into account as the interconnected systems are automatically controlled in accordance with the present invention.

*The need for automatic control of the systems of Fig. 1*

As is well known to those skilled in the art, if each of the generating stations of the Fig. 1 arrangement could supply all of the power required in its area, if every area could be equipped with suitable generating facilities sufficient for its needs, and if there could be no failure of each generating station to supply its immediate load, there would be little reason to interconnect electrical power generating stations and systems except for synchronous timing purposes. If this were the case, there would also be little need for automatic control which it is the purpose of the present invention to effect.

However, those skilled in the art well know that the ideal situations and conditions just enumerated surely do not exist in practice, and that electrical power generating systems, distributing systems, and their loads must be interconnected to as great an extent as is practically possible in order to assure an adequate supply of electrical power to the loads of all areas under all conditions of generator failure, load increases above local generating capacity, other equipment failure, etc.

When such interconnections are made, however, there is created an immediate need for means to control the various interconnected generating facilities relative to one another and relative to the various loads and line capacities throughout the systems. The multitude of problems which arise under these conditions are well known to those skilled in the art, and need not be elaborated on herein. Further, the inadequacies and disadvantages of the previously known and utilized methods and equipments for effecting load control have been presented above and need not be repeated at this time. Suffice it to say that many problems are involved when it is attempted to place interconnected electrical power generating stations under automatic control, but that such control is effected with a far higher degree of efficiency, simplicity, reliability, and flexibility, by the use of the present invention, than can be obtained with any of the other, previously known forms of load control now being employed.

Operation of the arrangement of Fig. 1

As was mentioned previously herein, the voltage phase angle between two interconnected electrical power sources is a measure of the power transfer between the sources, other conditions being constant. This means that the phase angle between the voltages at the opposite ends of an electrical tie line bears a definite, fixed relation to the power, both useful and reactive, passing along the line under a given set of conditions. However, since such conditions are known to vary in practice, it cannot be properly said that a given phase angle between the voltages at the opposite ends of an interconnection is always representative of the same flow of power over the interconnection. Nevertheless, the important fact is that the automatic maintenance of an appropriate phase angle between the voltages at the ends of a line results in automatic operation of the line within the limits of stability therefor, and with a high degree of operating efficiency. In addition, it is also an important fact that the flow of power over such a line can be changed by changing the value of said phase angle. These facts apply equally as well to tie lines between systems and to tie lines between generating stations within systems. From this it can be seen that the load on an interconnection or a tie line can be controlled to best advantage by regulating the associated generating equipment as necessary to maintain the voltage phase angle between the ends of the line constant at an appropriate, desired value.

This phenomenon is utilized by us in carrying out the automatic control of interconnected electrical power generating systems according to the present invention. With reference to Fig. 1, the primary problem or requirement existing in the illustrated group of interconnected systems is to provide automatic control of the generating stations 101, 102, 103, 201, 202, 301, 302, and 303 so as to maintain the power flows or interchanges over the tie line interconnections 1 and 10 at maximum values, when needed, without exceeding the limits of stability or the capacities of the lines, and hence to provide operation of the lines at maximum efficiency, even in the presence of widely variable and/or movable loads and generation along the lines.

An equally important requirement in the systems of Fig. 1 is to provide automatic control of the generating stations enumerated above so as to maintain the power flows or interchanges over the various local lines 106, 107, 108, 205, 206, 306, 307, and 308 at the values commensurate with maximum operating efficiency. In the manner which will now be described, the automatic control effected on the interconnected systems of Fig. 1 by means of the phase angle control apparatus of the present invention is operative to fulfill the requirements just specified, as well as to provide the numerous operating features, such as system time and frequency control, listed previously herein.

In the operation of the phase angle control apparatus on the systems of Fig. 1, a separate reference signal representative of the phase of the voltage of each of the system busses of the systems 100, 200, and 300 is sent to the inter-system dispatcher's office 11 by means of a respective one of the channels 113, 210, and 313. These reference signals are combined at the office 11 to form what we choose to call a resultant reference signal, the latter having a phase angle, relative to an arbitrary, fixed zero value, which is the vector summation or resultant of the relative phase angles of the voltages of the three system busses. The phase of the resultant reference signal is advantageously defined and utilized as the zero phase or reference phase for the entire group of interconnected systems.

The resultant reference signal just defined is divided into three system control signals in the dispatcher's office 11. Each of these three control signals is of adjustable phase relative to the resultant reference signal or reference phase, and is individual to a corresponding one of the three systems 100, 200, and 300. The control signal for the system 100 is sent from the office 11 over the channel 112 to the local dispatcher's office 105 of the system 100, while the control signal for the system 200 is sent from the office 11 over the channel 209 to the local dispatcher's office 204 of the system 200. Finally, the control signal for the system 300 is sent from the office 11 over the channel 312 to the local dispatcher's office 305 of the system 300.

Each of the system control signals received at the corresponding one of the several local dispatchers' offices is representative of the phase angle which is to be maintained between the voltage on the bus of the corresponding system and the resultant reference signal. Of more practical significance is the fact that each of the received system control signals is representative of the phase angle which is to be maintained between the system bus voltage of the corresponding system and the bus voltages of the other two systems. Each of such voltage phase angles, as noted above, determines the magnitude and direction of the interchange of electrical power between the two systems involved under any given conditions, and hence determines the power flow over the tie line 1 or 10 or both, as the case may be, under those conditions. Accordingly, the bus voltage phase angle selected to be maintained at any given time between any pair of the systems 100, 200, and 300 is the phase angle corresponding to the operation of the tie line or lines between the two systems involved in the desired manner under the prevailing conditions.

In order to cause the system control signals sent to the local dispatchers' stations to be representative of the phase angles which are to be maintained between the bus voltages of the systems, the inter-system dispatcher adjusts the phases of the three system control signals relative to the resultant reference signal, or, more significantly, relative to each other, until the phase angle between each pair of system control signals is the phase angle which is to be maintained between the bus voltages of the corresponding systems, and hence is the phase angle corresponding to the desired operation of the corresponding line at that time.

It is assumed, though not illustrated, herein that indications of the power flowing at various strategic points throughout the interconnected systems are telemetered in any conventional manner from those points to the inter-system dispatcher's office 11 to permit the proper phase angles to be selected in the light of the actual prevailing loading of the generating stations and tie lines. As will be apparent as the present description proceeds, however, such indications do not actually enter into the automatic control actions effected by the phase angle control apparatus, but rather serve merely as a guide when the values of the phase angles to be automatically maintained are being determined. Further, it is contemplated that measurements of the phase angle differences between the several systems may be utilized to eliminate the need for the telemetered load values just mentioned.

At each of the local dispatchers' offices 105, 204, and 305, the system control signal received from the inter-system dispatcher's office 11 is subdivided into as many station control signals as there are generating stations to be controlled in the corresponding system. For example, three of such station control signals are derived in the dispatcher's office 105 of the system 100, each of these signals being individual to a corresponding one of the stations, 101, 102, and 103. The phase of each of these station control signals is adjustable with respect to the phase of the received system signal and with respect to the phases of the other derived station control signals, whereby the local dispatcher for each system can set the relative phase angles of the station control signals at the values corresponding to desired operation of the interconnections between the generating stations of the respective system.

Using again the system 100 as an example, one of the three station control signals originating in the local dispatcher's office 105 is sent over the channel 109 to the station 101, while the second of these station control signals is sent over the channel 110 to the station 102. In addition, the third of the station control signals for the system 100 is sent from the office 105 over the channel 111 to the station 103.

Similarly, each of the station control signals derived in the local dispatcher's office 204 of the system 200 is sent to the respective one of the stations 201 and 202 over the corresponding one of the channels 207 and 208. Finally, each of the station control signals derived in the local dispatcher's office 305 of the system 300 is sent to the respective one of the stations 301, 302, and 303 over the corresponding one of the channels 309, 310, and 311.

In accordance with the present invention, each of the generating stations of Fig. 1 is equipped with phase responsive, automatic control apparatus which is operative to control the station output automatically as dictated by the received station control signal. At each station, the phase of the station control signal received from the associated local dispatcher's office is automatically compared by the phase responsive control apparatus with the phase of the station output bus voltage, and the generators of the station are automatically controlled to maintain the station power output at the value required to produce a station output voltage phase which is the same as the phase of the received station control signal. In other words, the phase responsive control apparatus in each of the generating stations automatically controls the station generators to maintain the station output at the value which makes the phase difference between the station bus voltage and the station control signal equal to zero.

From the description just given, it should be apparent that the local dispatcher of each of the systems 100, 200, and 300 can set the phase angles which are to be automatically maintained between the outputs of the several stations of the corresponding system, and can thereby establish desired power interchange conditions within the system. Such operation can be seen to be analogous to that by means of which the inter-system dispatcher sets the phase angles which are to be automatically maintained constant between the outputs of the several interconnected systems for establishing desired power interchange conditions within the group of systems.

As in the case of the inter-system dispatcher, it is herein assumed, though not illustrated, that indications of the power flowing at strategic points within each of the systems 100, 200, and 300 are telemetered to the office of the corresponding local dispatcher to permit the proper phase angles to be selected in the light of the existing loading and generating conditions. It should be noted, however, that such indications do not actually enter into the automatic control actions effected by the phase angle control apparatus, but rather serve merely as a guide in the process of determining the values of the various station output voltage phase angles which are to be automatically maintained. As previously noted, it is contemplated that measurements of the phase angle differences between the several systems may be utilized to eliminate the need for the telemetered load values just mentioned.

From the foregoing, it should be evident that the automatic control effected by the apparatus of the present invention is characterized by the numerous operating features enumerated previously herein. Certain of these features, such as the manner in which system time and frequency control is automatically effected, and the manner in which the control apparatus and the interconnected systems behave under both normal and abnormal conditions, will be elaborated on more fully herein and will be illustrated by means of examples in the following detailed description of the illustrated, preferred forms which the arrangement illustrated broadly in Fig. 1 and its components may take.

Figure 2:
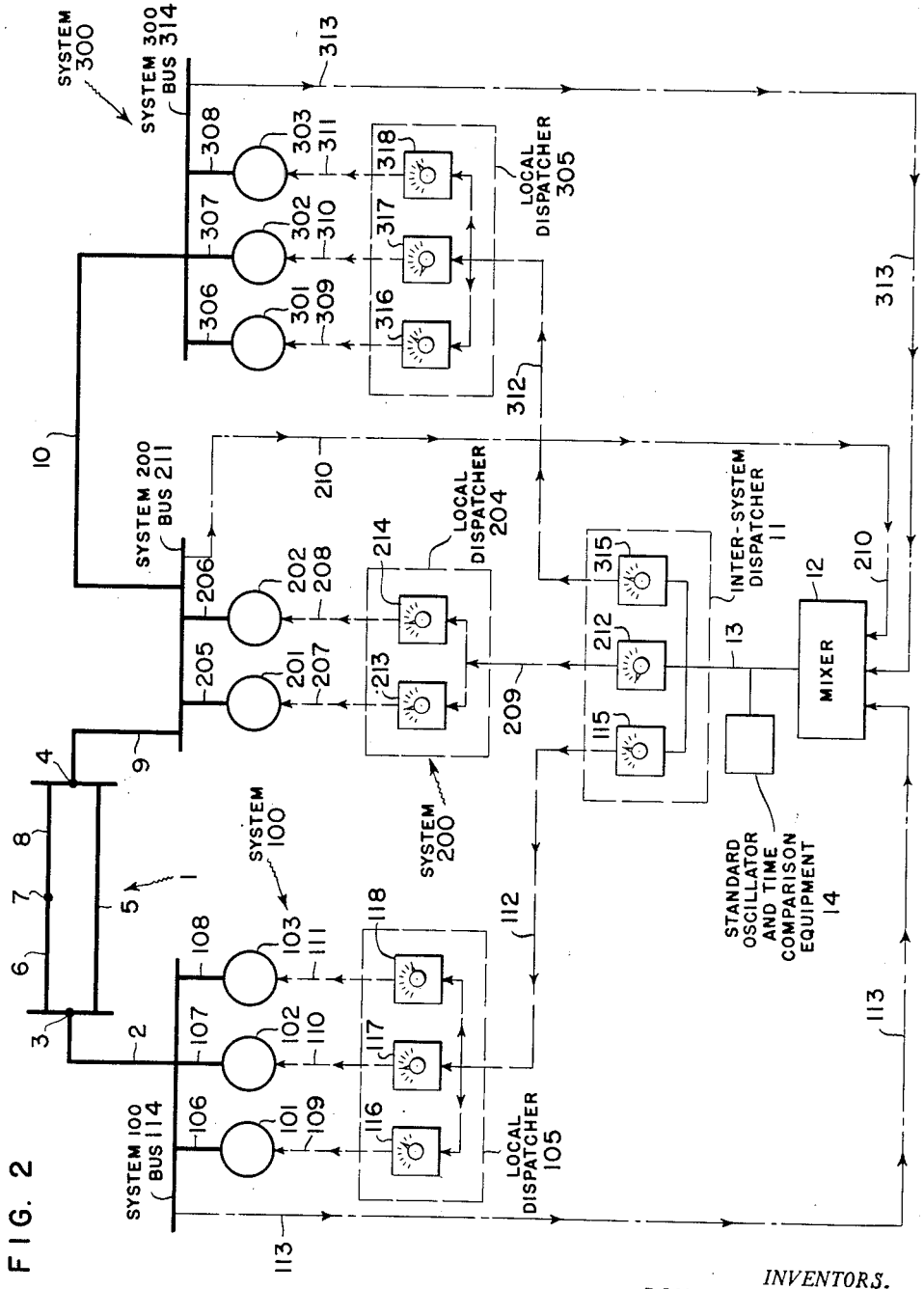
Fig. 2 is a diagrammatic representation of a preferred form which the phase angle control interconnections and instrumentalities of Fig. 1 may take.

*The apparatus of Fig. 2*

There is illustrated in Fig. 2 a preferred form which the phase angle control interconnections and instrumentalities shown broadly in Fig. 1 may take. Thus, the Fig. 2 arrangement includes the three electrical power systems 100, 200, and 300, their respective local or system dispatchers' offices 105, 204, and 305, and their respective generating facilities and interconnections. As in the case of the showing of Fig. 1, the circles employed for diagrammatic representation of the several generating stations of Fig. 2 are intended also to represent the immediate loads served by the associated station. Further, the components of the Fig. 2 arrangement which are also shown in Fig. 1 bear the same reference characters in both figures.

In Fig. 2, the tie lines 106, 107, and 108, which are respectively associated with the generating stations 101, 102, and 103 of the system 100, are shown connecting their associated stations to the system bus 114. Similarly, the tie lines 205 and 206, which are respectively associated with the generating stations 201 and 202 of the system 200, are shown connecting their associated stations to the system bus 211. Finally, the tie lines 306, 307, and 308, which are respectively associated with the generating stations 301, 302, and 303 of the system 300, are shown connecting their associated stations to the system bus 314. The busses 114, 211, and 314 are assumed to be located at the respective substations 104, 203, and 304 of Fig. 1.

As in Fig. 1, the tie line or transmission line 1 is shown in Fig. 2 as interconnecting the systems 100 and 200. Specifically, Fig. 2 shows the line 1 connected between the system busses 114 and 211. Likewise, the systems 200 and 300 are interconnected in Fig. 2 as in Fig. 1, the tie line or transmission line 10 being shown in Fig. 2 connected between the system busses 211 and 314.

The inter-system dispatcher's office 11 of Fig. 2 is seen to include three manually adjustable phase shifting devices 115, 212, and 315. Each of these devices is individually associated with a corresponding one of the systems 100, 200, and 300, and constitutes the means by which the inter-system dispatcher designates the system bus voltage phase angles which are to be automatically maintained by the apparatus. To this end, the reference signals obtained from the systems 100, 200, and 300 over the respective channels 113, 210, and 313 are combined in a mixer 12 to produce the aforementioned resultant reference signal, and the latter is applied over conductor means 13 to the input of each of the phase shifting devices 115, 212, and 315. Standard oscillator and time comparison equipment 14 is adapted to be connected to the conductor means 13 for the purpose of effecting system time and frequency control as will be described hereinafter.

The output of the phase shifting device 115 is the system control signal for the system 100, and is supplied from the device 115 to the local dispatcher's office 105 over the channel 112. Similarly, the output of the device 212 is coupled to the local dispatcher's office 204 of the system 200 over the channel 209. Finally, the output of the device 315 is coupled to the local dispatcher's office 305 of the system 300 over the channel 312.

Each of the phase shifting devices 115, 212, and 315 is operative to produce an output signal which is shifted in phase with respect to the applied input signal by an amount determined by the setting of the device. Accordingly, the relative settings of any two of the phase shifting devices 115, 212, and 315 determine the output bus voltage phase angle which is to be maintained constant between the bus voltages of the two corresponding systems, and hence establish the magnitude and the direction of the power interchange between said systems for the existing conditions.

From the foregoing, it is evident that the resultant reference signal supplied to the inter-system dispatcher's office 11 is divided by the phase shifting devices 115, 212, and 315 into three system control signals, each of which has a phase, relative to the assumed zero phase of the resultant reference signal, which is determined by the setting of the associated phase shifting device, and hence has a phase, relative to the other two system control signals, which is determined by the relative settings of the respective phase shifting devices. Therefore, the relative settings of the devices 115, 212, and 315, as made by the inter-system dispatcher, determine the power interchange conditions to be maintained among the several interconnected systems 100, 200, and 300 over the lines 1 and 10.

Each of the local or system dispatchers' offices 105, 204, and 305 is seen to include a separate, manually adjustable phase shifting device for each of the generating stations of the corresponding system. Thus, the office 105 for the system 100 includes phase shifting devices 116, 117, and 118 which are individually associated with the respective stations 101, 102, and 103. Similarly, the office 204 for the system 200 includes phase shifting devices 213 and 214 which are individually associated with the respective stations 201 and 202. Finally, the office 305 for the system 300 includes phase shifting devices 316, 317, and 318 which are individually associated with the respective stations 301, 302, and 303. Each of the local phase shifting devices 116, 117, 118, 213, 214, 316, 317, and 318 may be identical to the others and to the devices 115, 212, and 315 of the inter-system dispatcher's office. A typical form which such devices may take is illustrated in Fig. 3 and will be described in connection with this figure hereinafter.

As shown, the system 100 control signal from the inter-system dispatcher's phase shifting device 115 is sent over the channel 112 and is applied to the inputs of the local phase shifting devices 116, 117, and 118. The latter divide the received system control signal into three station control signals, each of which is sent from the respective one of the devices 116, 117, and 118 over the corresponding one of the channels 109, 110, and 111 to the corresponding one of the stations 101, 102, and 103. The phase angle between each of these station control signals and the corresponding received system control signal is determined by the setting of the associated local phase shifting device, whereby the phase angle between any two of the station control signals is determined by the relative settings of the corresponding two local phase shifting devices.

As will be apparent from the above, the phase angles which are to be automatically maintained between the output bus voltages of the stations 101, 102, and 103 are determined by the relative settings of the phase shifting devices 116, 117, and 118, whereby the desired power interchange conditions between the stations and loads are established in conformity with the relative settings of the devices 116, 117, and 118.

It appears to be desirable to note at this point that, when two interconnected generating stations supply power locally to their individual loads as well as over an interconnecting line, as is assumed to the case for the systems illustrated herein, a given phase angle relationship between the output voltages of the two stations is not accompanied by a corresponding, fixed power output for each of the stations. Instead, the actual station outputs will automatically be varied as necessary to maintain the voltage phase angle constant at the selected value corresponding to the desired operation of the interconnection.

The system control signal for the system 200 is sent from the inter-system phase shifting device 212 over the channel 209 to the inputs of the local phase shifting devices 213 and 214. The latter divide the received system control signal into two station control signals, each of which is sent from the respective one of the devices 213 and 214 over the corresponding one of the channels 207 and 208 to the corresponding one of the stations 201 and 202. In the same manner as described above in connection with the system 100, the relative settings of the devices 213 and 214 determine the value of the phase angle to be maintained between the stations 201 and 202.

The system control signal for the system 300 is sent from the inter-system phase shifting device 315 over the channel 312 to the inputs of the local phase shifting devices 316, 317, and 318. The latter divide the received system control signal into three station control signals, each of which is sent from the respective one of the devices 316, 317, and 318 over the corresponding one of the channels 309, 310, and 311 to the corresponding one of the stations 301, 302, and 303. In the same manner as described above for the systems 100 and 200, the relative settings of the devices 316, 317, and 318 determine the values of phase angle to be maintained between the stations 301, 302, and 303.

*Operation of the Fig. 2 arrangement*

In the operation of the arrangement illustrated in Fig. 2, the inter-system dispatcher adjusts the settings of the phase shifting devices 115, 212, and 315 to the values which cause desired values and directions of power interchange to take place between the several interconnected systems as dictated by the prevailing conditions. The making of such adjustments of the phase shifting devices is facilitated by the power flow readings which are assumed to be telemetered to the inter-system dispatcher's office 11 from strategic points in the systems.

Once the devices 115, 212, and 315 are so adjusted or set, each system will be automatically controlled, within its operating limits, to maintain the required system power output necessary to provide the desired optimum operation of the various interconnections, even in the presence of varying loads, generator failures, line failures, etc. within the scope of operation of the automatic control facilities. Condition changes tending to cause departures from the desired operating conditions cause each of the connected generating stations in the system or systems involved to be automatically regulated as necessary to prevent, or at least minimize, such departures.

In a manner analogous to that just described in connection with the inter-system control effected from the dispatcher's office 11, each of the several local or system dispatchers adjusts the settings of the local phase shifting devices of the corresponding system to the values which cause the outputs of the several stations of the system to be those necessary to establish the power interchange relationships between the system stations commensurate with the desired optimum operating conditions of the system under the prevailing conditions. The making of such adjustments of the local phase shifting devices is facilitated by the power flow readings which are assumed to be telemetered to the local dispatchers' offices 105, 204, and 305 from strategic points in the corresponding systems.

Once the local dispatcher of any one of the systems 100, 200, and 300 has adjusted or set the local phase shifting devices of the corresponding system to cause the establishment of the desired power interchange relationships within the system, each station will be automatically controlled, within its capacity, to produce the necessary power output to maintain the associated tie line power flow at whatever value is required to cause the selected phase angle to be maintained between the voltages at the ends of the line. When a change in the total system output is called for by the inter-system dispatcher by a shift in the phase of the system control signal sent to the corresponding local dispatcher's office, the several station outputs of the affected system will be changed automatically in the proper proportion so as to maintain the power flow relationships within the system as close to the previously established values as possible.

When changing conditions make it desirable to do so, the inter-system dispatcher can change the power flows between the systems simply by readjusting the relative settings of the phase shifting devices 115, 212, and 315 as necessary to establish the newly desired flows. Similarly, each of the local dispatchers can change the tie line power flows between the stations of the corresponding system simply by readjusting the local phase shifting devices of the system as necessary to establish the new absolute and relative station power outputs necessary for the establishment of the newly desired power interchanges under the prevailing conditions.

If adjustments of the type last described should incidentally produce a net change in the phase of the output of the system involved, the resulting difference in tie line power flow would be noticed by the inter-system dispatcher, who would then compensate for this effect by a readjustment of the corresponding one of his phase shifting devices as necessary to return the tie line power flow to the original, desired value.

As was previously noted, the device 14 comprises standard oscillator and time comparison equipment which is connected to the resultant reference signal conductor means 13. The device 14 is utilized to supply a standard reference signal to the phase shifting devices 115, 212, and 315, and to the remainder of the phase angle control equipment, for system time and frequency control purposes as will now be described.

*Automatic system time and frequency control*

As is well known in the electrical power generation and distribution art, system time is the integral of the system frequency over a given period of real time. Also, system time may be defined as the indication or reading of a synchronous clock which is energized from the system. As is also well known, system time normally varies somewhat from real time unless suitable steps are taken to correct or control the system time by comparison to real time. Since it is practically always mandatory in the operation of electrical generating facilities that system time be held equal to real time, and that system frequency be held as nearly constant as possible at the correct value, due to the large number of frequency and time sensitive devices included in present day system loads, it is an important feature of the present invention that the latter is operative to fulfill such requirements in an accurate, efficient, and relatively uncomplicated manner.

To this end, the output or standard reference signal of the standard oscillator is combined with the resultant reference signal from the mixer 12 to produce a combined reference signal for application to the inter-system phase shifting devices. The standard reference or standard frequency output signal of the standard oscillator is assumed to have, or to be made to have, the same frequency as the normal operating frequency of the interconnected systems. This frequency may, by way of example, be assumed to be sixty C. P. S. Accordingly, when the frequency of the system has the normal value and there is no phase difference between the resultant reference and standard frequency signals, no time or frequency corrections are needed, and the combined reference signal does not differ in phase from the resultant reference signal.

In order to illustrate the manner in which the time and frequency control provisions of the present invention are operative to hold the system time and frequency substantially constant by immediately making appropriate corrections upon slight departures of the system time and frequency from the correct values, let it be assumed by way of example that the system frequency increases slightly above the normal value. Such an occurrence immediately causes a phase difference to appear between the resultant reference and standard frequency signals, with the result that the phase of the combined reference signal is changed from what it had been previous to the frequency increase and is made different from the phase of the resultant reference signal by an appropriate amount. For the specific example being considered, the frequency increase causes the resultant reference signal to lead the standard frequency signal, whereby the combined reference signal can be seen to be caused to lag the resultant reference signal.

This action of causing the combined reference signal to lag the resultant reference signal, and hence to lag the resultant of the outputs of the several systems, obviously causes each of the station control signals to lag the corresponding station output bus signal, whereby each of the station phase comparators is caused to function in the same manner as it does when the corresponding local dispatcher manually retards the phase of the station control signal to cause the station to decrease its output. Accordingly, the supply of power to the generators in each of the several stations is automatically reduced as necessary to slow down the generators and hence retard the phase of each station output until the resultant reference signal is once again caused to have zero phase difference with respect to the standard frequency signal. It is obvious that, when this condition is once again established, the frequency of the system will have been returned to the normal value, and the system time will have been corrected to conform to real time.

The basic manner in which the above described actions take place is dependent upon the fact that, for a given connected load on a generator, an increase or decrease in the power supplied to the generator will cause a respective increase or decrease in the speed and output frequency thereof, and will cause a corresponding change in the phase angle of the generated output.

In a manner which is analogous to that just described, a slight decrease in the system frequency below the normal value causes the resultant reference signal to lag the standard frequency signal, and hence causes a leading control signal to be sent to each of the several generating stations, whereby the automatic control equipment in each station adjusts the various generators as necessary to raise the system frequency and advance the phase of the station output until the phase of the resultant reference signal is advanced to cause zero phase difference to exist between the last mentioned signal and the standard frequency signal. When this condition is once more established, the frequency of the system will have been returned to the normal value, and the system time will have been corrected to conform to real time.

Likewise, system time is automatically corrected in a manner similar to that described above when a momentary departure of the system frequency from normal causes system time to slip slightly ahead of or behind real time. Upon such an occurrence, wherein the system frequency may be assumed by way of example to have increased slightly and then to have returned at once to the normal value without the assistance of the automatic control functions, the combined reference signal will differ appropriately in phase from the resultant reference signal until the time gained by the system during the momentary frequency departure is dissipated. It can readily be seen that such dissipation will be effected by the control actions exerted by the combined reference signal on the generators of the systems, as a result of which action the generators will be slowed down momentarily as necessary to reduce to zero the phase difference between the combined reference, standard frequency, and resultant reference signals.

From the above description, it should be apparent that system time and frequency are automatically controlled according to the present invention by the cooperation of the automatic phase angle and load controlling equipment and the standard frequency signal obtained from the apparatus 14. It is also apparent that such time and frequency control is automatically effected continuously and simultaneously with the load controlling actions. The compatibility between the several types of control simultaneously effected by the same equipment stems from the fact that the phase angle control functions of the invention which control system power flows utilize the comparison of control signals and station output signals of the same frequency: namely, the normal frequency of the system. This fact makes feasible the novel, accurate, and highly advantageous form of system time and frequency control just described.

Although the apparatus of Figs. 1 and 2 is normally operative to hold the system time and frequency within extremely close limits as described above, abnormal system conditions may sometimes arise and cause disturbances which result in inaccuracies in system time which exceed the capabilities of the apparatus to effect automatic correction. If such a situation occurs, the time comparison portion of the apparatus 14 may be employed to summarize the deviation which occurs between system time and real time, and such a deviation may then be corrected by the proper adjustment of the phase of the combined reference signal as necessary to bring the system and real times back into coincidence.

*The phase shifting device of Fig. 3*

A typical form which may advantageously be taken by each of the phase shifting devices 115, 212, 315, 116, 117, 118, 213, 214, 316, 317, and 318 of Fig. 2 is illustrated by way of example in Fig. 3. For illustration purposes, the device of Fig. 3 is assumed to be the device 115 of Fig. 2, and is seen to include input terminals 15 and 16, output terminals 17 and 18, a resistor 19, and a variable condenser 20. The input terminal 15 is connected by the resistor 19 to the output terminal 17, while the input terminal 16 is directly connected to the output terminal 18 by a conductor 21.

The variable condenser 20 of the device 115 is connected directly between the output terminals 17 and 18, and is provided with an adjusting shaft 22. The latter is provided with a suitable adjusting knob 23 having a pointer 24 which cooperates with a suitably calibrated scale 25 to indicate the angle through which the device is set, at any given time, to shift the phase of a signal applied to the input terminals 15 and 16. The device 115 is of conventional design, and the manner in which it is operative to produce an output signal between the output terminals 17 and 18 which bears a phase relation to the input signal between the terminals 15 and 16 dependent upon the setting of the condenser 20 is well known in the art, and requires no further description herein.

For the purposes of the present invention, each of the phase shifting devices may well be operable over a range of from zero to eighty degrees phase shift, this range embracing the values which are normally utilized in the operation of the invention.

In lieu of the relatively simple device shown by way of example in Fig. 3, other, more complicated or merely different phase shifting arrangements may be employed if preferences or conditions so warrant.

The control apparatus of Fig. 4

We have illustrated in Fig. 4, by way of example, a preferred form of the automatic control equipment which is assumed to be located at each of the generating stations shown in Figs. 1 and 2. For purposes of illustration, the equipment shown in Fig. 4 is designated as being that located in the generating station 101 of the system 100. Each of the equipments of the other stations, however, may well be the same as that shown for the station 101 in Fig. 4.

The generating station 101 is shown in Fig. 4 as including two turbogenerator units 26 and 27. Although these units are shown as being steam driven, it is noted that the control apparatus of the invention is equally well suited for controlling water powered generating units. Also, although two generator units are shown in the illustration of Fig. 4, it should be understood that the station 101, as well as each of the other stations of Figs. 1 and 2, may well include a larger or smaller number of generating units, in accordance with the existing, customary practice in the power industry.

The turbogenerator unit 26 comprises an adjustable governor device 28, a steam turbine 29, and a generator or alternator 30. The output of the latter is connected by a machine bus 31 to the bus 32 for the station 101. The turbogenerator unit 27 comprises an adjustable governor device 33, a steam turbine 34, and a generator or alternator 35. A machine bus 36 connects the output of the generator 35 to the station bus 32. The latter is connected to the system bus 114 by means of the line 106. In the well-known, conventional manner, the governor of each of the turbogenerator units 26 and 27 is operative to regulate the flow of supply steam to the associated turbine as necessary to cause the latter to drive the associated generator substantially at the speed corresponding to the setting or adjustment of the governor.

The automatic phase angle control equipment of the station 101 includes electrical, pneumatic, and hydraulic portions which cooperate to adjust the turbogenerator governors as necessary to hold the station bus voltage phase angle at the value dictated by the station control signal received from the local dispatcher. The electrical portion of the control apparatus includes a phase comparator 37 and an electro-pneumatic transmitter 38, while the pneumatic portion includes the transmitter 38, a pneumatic controller 39, a pneumatic indicator and controlling device 40 for the controller 39, a pair of manually adjustable pneumatic ratio relays 41 and 42, a pair of pneumatic-hydraulic governor actuators 43 and 44, and safety control equipment to be described hereinafter. The hydraulic portion of the control apparatus includes the governor actuators 43 and 44 and the adjustable or controllable portions of the governors 28 and 33.

The phase comparator 37 is a device which has two electrical input circuits and an electrical output circuit, and which is operative to produce in its output circuit a D. C. signal having a magnitude which is proportional to the phase angle between two A. C. signals of the same frequency respectively applied to the two input circuits, and having a polarity which is determined by the sign of the phase angle between the two input signals. In other words, the D. C. output signal of the device 37 has a magnitude which is proportional to the phase angle between the two A. C. input signals, and has one or the other polarity depending upon which of the two input signals is leading the other. The output signal of the device 37 appears between output terminals 45 and 46 thereof. A suitable form which the device 37 may take is shown in detail in Fig. 5 and will be explained in connection with that figure hereinafter.

The electro-pneumatic transmitter 38 is a device which is operative to produce a pneumatic or air output pressure of a magnitude dependent upon that of a D. C. signal applied to the transmitter input. Specifically, the transmitter 38 is of the zero-center type, and is operative to provide an output air pressure which has a predetermined median value when an applied D. C. signal is zero, and which increases proportionally to a predetermined maximum value when said signal is increased to a predetermined maximum value with a given polarity. Further, said output air pressure decreases proportionally to a predetermined minimum value when said signal is increased to a predetermined maximum value with the opposite polarity.

To this end, the transmitter 38 is provided with input terminals 47 and 48, an output air connection or line 49, and an air supply connection or line 50. As the voltage of a D. C. signal applied between the input terminals 47 and 48 is varied from zero to a predetermined maximum value with one or the other polarity, the pressure of the air in the output line 49 respectively increases or decreases proportionally from a median value.

The transmitter 38 may be of any of a variety of conventional, well-known forms, and may well be of the form of the Nonindicating Electronic Pneumatic Temperature Transmitter which is manufactured and sold by the Brown Instruments Division of the Minneapolis-Honeywell Regulator Company. That device consists of a self-balancing potentiometer portion of the type disclosed in the Wills Patent 2,423,540 which adjusts a pneumatic transmitter portion of the type disclosed in the Moore Patent 2,311,853 so that the transmitter portion is operative to deliver air at a pressure which is a function of the magnitude of a D. C. signal applied to the potentiometric portion.

Since the elements just mentioned are described in detail in the above enumerated patents, and since the particular device referred to, as well as other devices serving the same purpose, is well known in the art, no further description of the internal construction or operation of the device 38 is deemed to be necessary herein.

The pneumatic controller 39 and the associated indicator 40 may be of any suitable type, but are advantageously of the specific type shown in Fig. 4 which is manufactured and sold by the Brown Instruments Division of the Minneapolis-Honeywell Regulator Company. Since units of this type are now in extensive use and are familiar to those skilled in the art, no detailed description of their internal construction and operation appears to be necessary herein. Suffice it to say that the controller 39 includes two pneumatic elements which receive two transmitted air pressures, one from a measuring transmitter and one from a control-point setting portion of the indicator 40. The pneumatic elements of the controller respond to differences between these two transmitted air pressures and effect diaphragm movements which adjust the pressure of a controlled air output connection as necessary to hold the controlled variable which actuates the measuring transmitter at the control-point value.

To this end, the controller 39 and the indicator 40 are interconnected by a plurality of air lines, and are both furnished with supply air. Specifically, a manual-automatic air line 51, an output air line 52, a control-point or set point air line 53, and an input air line 54 are connected between the devices 39 and 40, and each of the latter is provided with a respective one of air supply connections 55 and 56. A solenoid valve 57 is connected in the manual-automatic air line 51 as a portion of the safety control equipment to be described hereinafter.

The indicator 40 is provided with an adjusting knob 58, a dual pressure indicating gauge 59, and function controlling valves 60 and 61. These devices are employed to permit the setting of the set point of the apparatus, the changeover from automatic to manual control and vice-versa, and the manual control of the controlled variable, all as is well known in the art.

When the units 39 and 40 are set to provide automatic control, the controller 39 is operative to maintain the pressure in the output air line 52 at the values necessary to cause the pressure applied to the input air line 54, which pressure is representative of the value of the controlled variable, to be automatically held substantially equal to the desired set point value as represented by the pressure in the set point air line 53. The desired set point is established by the suitable adjustment of the knob 58 on the indicator 40, which adjustment is facilitated by reference to the pressure gauge 59. The manual-automatic air line 51 makes it possible to shift between automatic and manual control by manipulating the proper devices on the indicator 40.

The specific control apparatus consisting of the devices 39 and 40 as just described is not novel with us, but is disclosed and claimed in the copending application of Stephen P. Higgins, Jr., et al., which was filed on December 28, 1950, and bears Serial No. 203,174.

The ratio relays 41 and 42 are pneumatic pressure-changing devices, each of which is operative to provide an output air pressure which bears fixed ratio and suppression relationships to an input air pressure, the values of the ratio and suppression being determined by the settings of separate manually adjustable portions of the device. To this end, each of the relay devices 41 and 42 is provided with a first manually adjustable means for adjusting the ratio relationship between the output and input pressures to the value which it is desired to maintain, and is also provided with a second manually adjustable means for adjusting the suppression relationship between the output and input pressures to the desired value. For any given settings of the ratio and suppression adjusting or setting means, the output pressure of each relay device will be maintained equal to the suppression setting plus the product of the input pressure and the ratio setting. Output pressures which are higher than the corresponding input pressures are made possible by supply air lines connected to the relay devices.

Inasmuch as ratio relay devices of the type just described are commercially available in various forms and are well known in the art, no detailed description of their construction or method of operation is seen to be required herein. The function of these devices in the Fig. 4 arrangement will be described hereinafter.

The governor actuators 43 and 44 are pneumatic-hydraulic conversion units, each of which is operative to convert changes in the relatively low output pressure of the control apparatus to corresponding changes in the relatively high hydraulic force which is utilized within the associated governor for adjusting or actuating the latter. As is well known, it is common practice in the governor art to adjust or set the operating point of a governor by varying the force with which a hydraulic fluid, such as oil, acts on a piston whose position determines the governor operating point. Accordingly, each of the devices 43 and 44 is operative to effect changes in the hydraulic force acting on the associated governor actuating piston which are proportional to correspondnig changes in the pneumatic output pressure of the pneumatic controller 39. A device particularly suitable for this use is the Pneumatic-Hydraulic Governor Actuator currently being made and sold by the Brown Instruments Division of the Minneapolis-Honeywell Regulator Company. However, any other devices of known construction which will perform this function in a satisfactory manner are suitable for use as the devices 43 and 44.

The various components of the arrangement of Fig. 4 which have just been described are suitably interconnected to provide the desired operation of the apparatus. Thus, the electrical output terminals 45 and 46 of the phase comparator 37 are respectively connected by conductors 62 and 63 to the input terminals 47 and 48 of the electro-pneumatic transmitter 38. The output air line 49 of the latter is connected to the input air line 54 of the pneumatic control apparatus, and the output air line 52 of this apparatus is connected by a control air line 64 to the air inputs of each of the ratio relays 41 and 42. The control air line 64 is also arranged to supply control air to the turbogenerator governor control arrangements of any other generators, not shown, which may be located in the station 101. In addition, the air line 64 is arranged to supply control air to the combustion control equipment, not shown, which controls the firing of the boilers supplying steam to the various turbogenerators, all as is the usual practice in the electrical power generating art.

The air output of the ratio relay 41 is connected by an air line 65 to the input of the governor actuator 43, and the output of the latter is connected by suitable hydraulic connecting means 66 to the actuating mechanism in the governor 28. Similarly, the output of the ratio relay 42 is connected by an air line 67 to the input of the governor actuator 44, and the output of the latter is connected by suitable hydraulic connecting means 68 to the actuating mechanism in the governor 33. Included in the air lines 65 and 67 are respective solenoid valves 69 and 70 which are portions of the safety control equipment to be described hereinafter.

As shown, the station control signal received from the local dispatcher's office 105 over the channel 109 is applied to one of the two electrical input circuits of the phase comparator 37. In addition, a signal representative of the phase of the output voltage on the station bus 32 is applied to the other input circuit of the device 37 by means of a conductor 71. Thus, there are applied to the input circuits of the device 37 the two signals whose phases are compared for determining the phase angle between the signals, which angle is utilized for controlling the operation of the turbogenerators 26 and 27.

*Operation of the Fig. 4 arrangement*

As was stated hereinbefore, the control apparatus of Fig. 4 is operative to effect the automatic adjustment of the governors 28 and 33 of the respective turbogenerators 26 and 27 as necessary to cause the phase of the station output voltage on the bus 32 to be substantially identical to the phase of the station control signal received over the channel 109. In other words, the turbogenerators 26 and 27 are automatically operated as required to maintain substantially zero phase angle between the signals applied to the device 37 by the channel 109 and conductor 71.

To this end, the D. C. output signal of the phase comparator 37, which is representative of the magnitude and sign of any phase angle between the input signals applied to the comparator, is applied to the input of the transmitter 38, whereby the output air pressure in the line 49 of the latter is representative of the magnitude and sign of said phase angle. In a working embodiment of the Fig. 4 arrangement employing the specific forms of apparatus described hereinbefore, it is noted by way of illustration and example that the output signal of the phrase comparator 37 appearing between the conductors 62 and 63 is zero when there is zero phase angle between the comparator input signals, and that the transmitter output air pressure in the line 49 is 9 p. s. i. under this condition. Further, as the phase angle between said comparator input signals is increased from zero to +30°, with the station control signal leading the bus voltage signal, the comparator output signal increases proportionally from zero to +50 millivolts with the conductor 62 positive with respect to the conductor 63, causing the transmitter output pressure in the line 49 to increase proportionally from 9 p. s. i. to 15 p. s. i. Also, as the phase angle between the comparator input signals is increased from zero to —30°, with the station control signal lagging the bus voltage signal, the comparator output signal increases proportionally from zero to —50 millivolts with the conductor 62 negative with respect to the conductor 63, causing the transmitter output pressure in the line 49 to decrease proportionally from 9 p. s. i. to 3 p. s. i.

In summary, it is seen from the above example and description that the transmitter output air pressure in the line 49 is increased and decreased from a median value in proportion to the departure of the phase angle between the phase comparator input signals from zero in one direction or the other, respectively.

The air pressure in the line 49, representative of the phase angle which is to be maintained at substantially zero value, is applied to the input air line 54 of the pneumatic control apparatus consisting of the controller 39 and indicator 40. When operating under the conditions listed above, the controller 39 is adjusted to have a set point of 9 p. s. i., which means that the indicator 40 applies a set point pressure of 9 p. s. i. through the line 53 to the controller 39 at all times. Accordingly, when the transmitter output pressure or controller input pressure in the lines 49 and 54 is 9 p. s. i., as it is under the condition of no phase angle difference between the comparator inputs, this input pressure is said to be at the set point value, and the controller operation is such as to maintain the necessary pressure in the output lines 52 and 64 to hold the input pressure at this set point value. Departures of the input pressure from the 9 p. s. i. set point value cause the controller 39 to make whatever changes in the controller output pressure are necessary in order to bring the input pressure back to the set point value.

The output or control air pressure produced by the controller 39 in the line 64 is effectively applied to the adjusting portions of the governors 28 and 33 through the respective connections and devices associated with each governor, and this pressure is regulated by the controller 39 as necessary to cause the governors to be adjusted to the conditions which result in zero phase angle between the inputs to the phase comparator, and hence in a station output voltage which is of the phase desired by the local dispatcher.

Specifically, the control air pressure in the line 64 is applied to the input of the ratio relay 41, and the output pressure of the latter, related to the input pressure in accordance with the ratio and suppression settings of the relay, is applied to the input of the governor actuator 43. The output of the actuator 43 is applied to the portion of the governor 28 which determines the operating point of the latter, whereby the pressure in the line 64 effectively adjusts the governor 28 as previously noted.

The relationships between the devices and connections associated with the governor 33 are the same as those existing between the governor 28 and its associated elements as just described. That is, the control air pressure in the line 64 is applied to the input of the ratio relay 42, and the output pressure of the latter is applied to the input of the governor actuator 44. The output of the latter is applied to the adjusting portion of the governor 33, whereby the pressure in the line 64 effectively adjusts the operating point of the governor 33 as previously noted.

Before proceeding with an explanation of the specific operation of the Fig. 4 apparatus, several assumed characteristics thereof should be noted. In the first place, it is assumed herein that each of the governors 28 and 33 is operative to increase the rate of flow of steam to the associated turbine, and hence to increase the output of the associated generator, when the hydraulic control pressure applied to the governor is decreased. Conversely, an increase in the governor control pressure decreases the steam supplied to the associated turbine and hence decreases the output of the associated generator. This characteristic is conventional in the governor art.

Secondly, it is assumed herein that the controller 39 is arranged in the known manner to be reverse-acting, whereby an increase in the controller input pressure produces a decrease in the controller output pressure. This characteristic cooperates with that of the governors as just described to cause pressure increases in the controller input to produce increases in the outputs of the turbogenerators.

Thirdly, the various actions and operating examples described herein are assumed to lie within the practical operating ranges of the devices involved.

As an example of the operation of the control apparatus of Fig. 4, utilizing the specific operating values given above for purposes of illustration, let it be assumed that the turbogenerators 26 and 27 are operating in the desired manner so that the station bus voltage has the phase angle which is called for by the local dispatcher at that time. Under this condition, which may be called the balanced condition, there is no phase difference or angle between the input signals applied to the phase comparator 37, and hence the output of the latter is zero. The corresponding pressure of 9 p. s. i. is therefore applied to the input of the controller 39 from the output of the transmitter 38, and the controller output pressure in the line 64 is the value required to hold the adjustments of the governors 28 and 33 at the positions which cause the turbogenerator outputs to have the values necessary to maintain the desired bus voltage phase angle.

The power generated by each of the turbogenerators 26 and 27, and by any other generators which may be located in the station 101, is jointly determined by the control pressure in the line 64 and by the settings of the associated ratio relay device. Thus, for example, for any given control pressure, the outputs of the two generators 30 and 35 are in the ratio of the ratio settings of the corresponding ratio relays 41 and 42. In other words, the total output of the two generators 30 and 35 is always divided between the latter in the ratio of the ratio settings of the devices 41 and 42. Accordingly, the latter are adapted to be adjusted to the proper ratio and suppression settings to cause the generators to divide the total load in the desired manner.

If it is necessary or desirable at any time to change the fraction of the total load supplied by a particular generator, and hence to reapportion the total load among the several generators, or if it becomes necessary or desirable to remove a generator from service and to reapportion the total load among the remaining generators, such operations can be readily effected by the proper readjustment of the various ratio relays involved.

Continuing with the example of the operation of the Fig. 4 control apparatus, let it now be assumed that the local dispatcher for the system 100 wishes the station 101 to deliver a greater portion of the total system load than it was producing under the balanced condition described above. To this end, the dispatcher will advance the setting of the phase shifting device 116 in the office 105 to a new position corresponding to the new, higher output which it is desired to have the station 101 produce. Although such resetting of the device 116 would probably be carried out slowly in a series of small steps so as to permit the dispatcher to note and follow the increasing station output by means of the telemetered load indications, it will be assumed herein for purposes of simplification that the device 116 is advanced in one step to a new setting which is known to correspond to the desired new value of station power output under the prevailing conditions.

The result of the above described adjustment of the device 116 will be an advancement of the phase of the station control signal relative to that of the bus voltage signal at the input of the comparator 37. In other words, the control signal will be made to lead the bus voltage signal, and a positive phase angle will be produced between these two signals. This in turn will unbalance the apparatus and will cause the comparator 37 to apply a corresponding positive signal to the input of the transmitter 38, a positive signal being one which renders the conductor 62 positive with respect to the conductor 63. The output pressure of the transmitter 38 will then increase proportionally, whereby the output of the controller will be correspondingly decreased, since the latter is arranged to be reverse-acting as previously explained. Therefore, the hydraulic pressures applied to the governors 28 and 33 will be correspondingly decreased, and will cause a suitable increase in the rate of flow of steam to each of the turbines 29 and 34. This will cause the outputs of the generators 30 and 35 to increase, whereby the total station output will be increased. Due to the action of the ratio relay devices 41 and 42, the increased steam flows to the two turbines will be in the proper ratio to cause the generators 30 and 35 to share the increased load in the desired proportion, assuming that the relay devices 41 and 42 have been appropriately set.

The increased station output will be accompanied by an advance in the phase of the station bus voltage as previously noted. Accordingly, the phase difference or angle between the input signals applied to the comparator 37 will diminish, as will the comparator output voltage. As a result, the transmitter output pressure will drop toward its median value and hence toward the controller set point value. All of these actions will continue until the last mentioned pressure once more coincides with the set point pressure, at which time the station output will have increased to a new value commensurate with the new phase angle of the station control signal, and the phase angle between the comparator input signals will have been reduced to zero.

In a corresponding manner, the total output of the station 101 can be decreased by reducing the magnitude of the phase angle of the station control signal. Briefly, such a reduction causes a corresponding negative voltage to be applied to the transmitter 38, whereupon the output pressure of the latter decreases proportionally from the median value. This decreases the controller input pressure below the set point value and causes the controller 39 to provide a corresponding increase in output pressure. The latter acts effectively on the governors 28 and 33 to reduce the steam supply to the turbines 29 and 34, and hence to reduce the generator and station outputs. These actions continue until the station output is that corresponding to the new phase angle of the station control signal.

In addition to changing the station bus voltage phase angle automatically in the presence of changes in the phase angle of the station control signal as just described, the control apparatus of Fig. 4 is automatically operative to return the bus voltage phase to that of the station control signal when the latter is constant and the bus voltage phase is caused to depart from its desired value by some change in a condition in the station or external thereto. For example, let it be assumed that a change occurs in the load within the system 100 such that the phase of the station bus voltage drops behind the phase of the station control signal. Insofar as the phase comparator 37 is concerned, this situation is identical to that first described above wherein the phase angle of the station control signal was purposely increased above that of the station bus signal. Accordingly, the controller 39 is operative under the conditions now being considered to decrease the governor control pressures as necessary to raise the station output to the value which will return the bus voltage phase angle to the previous desired value.

From the above it can readily be seen that the phase comparator 37 and the remainder of the turbogenerator control equipment controlled thereby respond solely to the phase angle between the input signals applied thereto, and respond to station control signal phase angle increases and decreases in the same manner as they respond to station bus voltage phase angle decreases and increases, respectively.

Although the foregoing descriptions of the construction and operation of the turbogenerator control apparatus have been directed to the control of turbines through the medium of adjusting the operating point of the conventional type of turbine governor now in extensive use in the power industry, it should be noted that an alternate form of turbine control in which the usual governors are dispensed with is equally as well suited for use with the present invention as is the particular form of turbine control illustrated and described by way of example herein. Specifically, the governors 28 and 33 and their actuators 43 and 44 may be entirely dispensed with in accordance with this alternate form of turbine control, and the control air pressure outputs from the ratio relay devices may be utilized directly to control throttle valves located in the turbine steam supply lines. The resulting operation of the turbogenerators 26 and 27 when this alternate form of turbine control is employed is the same as that described hereinbefore in connection with the governor form of turbine control shown in Fig. 4.

The previously mentioned safety equipment which controls the operation of the solenoid valves 57, 69, and 70 by applying appropriate electrical signals thereto serves to protect the station apparatus upon the development of abnormal operating conditions or similar occurrences. To this end, a signal is sent to the valve 57 to cause the latter to bleed the manual-automatic line 51, and hence to seal the controller 39 at the currently produced output control pressure, in the event that the total station output rises above a predetermined maximum value or drops below a predetermined minimum value. The turbogenerators are thus protected as a group from being overloaded, and are prevented from being shut down in the event that the load on the station is removed for one reason or another. When the operating conditions subsequently change and return the station load to a value within the predetermined desired operating range, the operation of the turbogenerators is automatically once again placed under the control of the devices 37, 38, and 39.

Furthermore, signals are sent simultaneously to each of the solenoid valves 69 and 70 when an operating defect makes it desirable to seal the governors and hold the turbogenerators in the operating conditions existing just prior to the development of the defect. However, this action differs from that which results from the actuation of the valve 57 since the safety equipment which actuates the valves 69 and 70 is arranged in the conventional manner to hold the governors sealed until an operator manually releases them following the correction of the defect.

In those cases where a defect involving only a single turbogenerator occurs, only the associated one of the valves 69 and 70 will be actuated, and only the offending turbogenerator will have its governor sealed. In each case, it is contemplated that the actuation of any or all of the solenoid valves will be accompanied by the production of suitable alarm signals in the conventional manner.

Since the safety equipment and its operation as just briefly described form no part of the present invention, no further or more detailed description of such equipment is deemed to be necessary herein.

The phase comparator of Fig. 5

We have illustrated in Fig. 5 one of various forms which the phase comparator 37 of Fig. 4 may take. As shown, the device 37 includes a first pair of input terminals 72 and 73, a second pair of input terminals 74 and 75, first and second amplitude limiters 76 and 77, which are assumed to be identical, a differential transformer 78 having first and second primary windings 79 and 80 and a secondary winding 81, a phase sensitive rectifier 82, a filter 83, and the output terminals 45 and 46.

As previously noted, the comparator 37 is a device which measures the difference between the phases of two applied voltage signals, or, in other words, is a device which measures the phase angle between two voltage signals. To this end, the device 37 includes two channels, the first of which includes the input terminals 72 and 73, which are connected to the input of the amplitude limiter 76. The output of the latter is in turn connected to the differential transformer primary winding 79.

Similarly, the second channel of the device 37 includes the input terminals 74 and 75, which are connected to the input of the amplitude limiter 77. The output of the latter is in turn connected to the differential transformer primary winding 80. The secondary winding 81 of the transformer 78 is connected to the input of the rectifier 82, the output of which is connected to the input of the filter 83. The output of the latter is connected in turn to the output terminals 45 and 46 of the device 37.

Operation of the Fig. 5 device

As was described hereinbefore, the station control signal from the channel 109 and the station bus voltage phase signal on the conductor 71 are applied to the inputs of the device 37. To this end, the A. C. signal from the channel 109 is applied to the input terminals 72 and 73, passes through the amplitude limiter 76, wherein it is clipped in a conventional manner, and appears across the primary winding 79. Also, the A. C. signal from the conductor 71 and some return path, such as ground, is applied to the input terminals 74 and 75, passes through the amplitude limiter 77, wherein it is clipped, and appears across the primary winding 80.

The transformer 78 is operative in the known manner to produce an A. C. output signal across the secondary winding 81 which has a magnitude and phase respectively dependent upon the extent and sense of the difference between the phases of the two A. C. signals respectively impressed on the primary windings 79 and 80. Accordingly, the signals from the limiters 76 and 77 are impressed on the respective windings 79 and 80 with the relative instantaneous polarities shown, whereby there is no signal produced across the secondary winding 81 when the phases of the two input signals are equal, or, in other words, when there is no phase difference between the two input signals. Under this condition, there is no output signal produced between the output terminals 45 and 46 as noted hereinbefore.

When the phase angle of the input signal from the channel 109 is greater than that of the other input signal, or, in other words, when the signal from the channel 109 leads the signal from the conductor 71 and the signal impressed upon the winding 79 leads the signal impressed upon the winding 80, there appears across the winding 81 an A. C. signal of what may be termed positive phase, the magnitude of this signal being proportional to the magnitude of the positive phase angle between the two input signals. The signal across the winding 81 is rectified by the device 82, is filtered by the device 83, and appears between the output terminals 45 and 46 as a D. C. signal having a magnitude which is proportional to that of the A. C. signal across the winding 81, and having a polarity corresponding to the positive phase of the last mentioned signal. As was previously mentioned, it is assumed herein that this polarity is such that the terminal 45 is rendered positive relative to the terminal 46.

When the signal impressed upon the winding 79 lags the signal impressed upon the winding 80, as occurs when the input signal from the channel 109 lags the other input signal, an A. C. signal of what may be called negative phase appears across the winding 81. This signal is rectified and filtered and appears between the output terminals 45 and 46 as a D. C. signal having a magnitude which is proportional to that of the negative phase angle between the two input signals, and having a polarity opposite to that of the output signal representing a signal of positive phase across the winding 81. As was mentioned hereinbefore, an output signal of said opposite polarity renders the terminal 45 negative with respect to the terminal 46.

The phase sensitive rectifier 82 may be of any of the numerous forms well known in the art, and may be supplied with a phase reference signal from any suitable source in the usual manner.

Some operating examples of the invention

Several examples will now be given to illustrate the manner in which the novel phase angle control apparatus of the present invention provides a superior type of automatic control of interconnected electrical systems, under both normal and abnormal operating conditions, which is characterized by the numerous operating advantages and features enumerated hereinbefore. At the outset, examples of the control effected under normal operating conditions will be given, and these will be followed by examples of operation under abnormal conditions.

As the first example of the operation of phase angle control according to the present invention, let it be assumed, with reference to Figs. 1 and 2, that the stations 101 and 102 of the system 100 are interconnected as shown, and that each station is supplying its local load as well as a portion of the load along the interconnection. Let it now be assumed that the local load associated with the station 101 suddenly rises considerably. This will disturb the predetermined phase angle relationships between the stations, and will cause the outputs of the generators of the stations involved to be automatically adjusted as necessary to restore the predetermined phase angle relationships. The result of this will be that the output of the station 101 will be increased as necessary to supply the additional load, providing that such an increase does not load the station 101 beyond its capacity. If, however, the station 101 cannot supply all of the required additional load, part of the latter will be supplied from the station 102 over the interconnection. It is apparent that such control causes each station to supply its own local load as far as possible within the station's capacity, and causes power to be brought in from another area only when the local load rises above the capacity of the local station. Therefore, the phase angle control of the present invention is seen to maintain the operation of the system within the limits of stability and at the optimum efficiency.

As another example, let it be assumed that each of the systems 200 and 300 is supplying its local system load as well as a portion of the load located along the interconnecting line 10. Let it now be assumed that the last mentioned load increases suddenly, and that this increase is concentrated near the end of the line which is adjacent the system 300. Such an occurrence will cause a momentary departure of the phase angle relationships between the systems from the predetermined values, and will cause the automatic adjustment of the outputs of the stations involved as necessary to reestablish the desired phase angle between the output voltages of the systems 200 and 300 and to reestablish the other predetermined phase angle relationships throughout the systems. The result of this will be that the output of the system 300 will be increased, within its capacity, to supply the additional load, and the line 10 will be required to carry only that additional amount of power from the system 200 necessary to supply the portion of the increased load which is not supplied by the system 300. In no case, however, will the stability of the line be adversely affected, since the phase angle between the voltages at the ends of the line will be automatically held to the predetermined value.

In each of the above examples, therefore, it is seen that an increased load causes the proper local system or station to increase its power output automatically, within its capacity, to supply the new load, thereby causing interconnections to handle only that portion of the load which cannot be supplied by the local facilities. Moreover, this operation is effected without exceeding the limits of stability or the capacities of the lines. Therefore the operation of the system is effected with an optimum degree of efficiency.

There will now be considered several examples of the operation of the phase angle control equipment under abnormal system conditions. With reference to Figs. 1 and 2, let it be assumed for the first example that the systems 100, 200, and 300 are operating in such a manner that each system is providing sufficient generation for the load in its own area. Under these conditions, there will be little or no exchange of power over the tie lines 1 and 10. If the system 200 should now loose a station, due, for example, to the opening of a breaker as the result of a line fault, the remaining station output voltage will drop back in phase and will decrease the phase angle of the system bus voltage a sufficient amount to cause tie line power flow over the lines 1 and 10 to the system 200 from the systems 100 and 300. If this additional load happens to be in excess of the ability of the systems 100 and 300, all of the generators of the systems will slow down somewhat, but this action will be reasonably uniform and essentially without the serious oscillations which are known to occur with other types of control systems under the same conditions.

As a second example, let it be assumed that conditions within the interconnected systems of Fig. 1 and 2 are such that a desired flow of power is taking place over the interconnection 1, and that this power flow causes the two lines between the points 3 and 4 to be loaded to capacity. If, under these conditions, one of the lines 5 and 6–8 is tripped open, due to a line fault or similar occurrence, the other line will not be overloaded and consequently opened, resulting in the splitting up of the interconnected systems, as would be the case with other forms of control systems. Instead, the remaining one of the two lines 5 and 6–8 will not be called upon to transmit power in excess of its capacity, and the various generators involved will be automatically adjusted to satisfy the new operating conditions without the occurrence of the undesirable surges and oscillations known to occur in systems under other forms of control.

As a third example, let it be assumed that it is desired to reestablish the interconnection between the systems 200 and 300 following the opening of the tie line 10 due to a line fault or similar occurrence. Since the two systems will have been held in synchronism by the automatic phase angle control apparatus during the time in which the line 10 was open, the interconnection can be remade without requiring the line 10 to carry the large synchronizing power flow which would be required if operating under other forms of control. Accordingly, the line 10 will be left clear to carry useful load power, and will be capable of carrying the larger blocks of power which are occasionally required to pass over such an interconnection.

Moreover, the phase angle control effected according to the present invention makes possible the high speed reclosing of tie line circuits without introducing system disturbances and oscillations. Therefore, opened lines can be safely put back in service to resume their load carrying functions much more quickly than with other forms of control.

It should be evident from the foregoing description that the automatic phase angle control of the present invention makes it possible to utilize the power handling capacity of a transmission or tie line to the fullest possible extent without exposing the line to unsafe operating conditions. That is, phase angle control makes it possible to preset the maximum power which a given line is to carry, and then permits actual line operation at this maximum value without the hazard of line overloading due to variations in magnitude and position of intermediate loads along the line. With other forms of control, however, lines must be operated at values considerably below their capacities in order to leave a safety range or establish a safety factor to take care of such intermediate loads and prevent them from overloading the lines. This makes evident an important one of the economic advantages obtainable when operating under phase angle control.

Another important feature of operation obtainable when phase angle control of the type disclosed herein is employed relates to the operation of the boilers which are assumed to supply the steam to drive the several generators of the interconnected systems. Since the continuous automatic operation of the phase angle control apparatus is such that power changes are practically always made in small increments, the problem of wide variations or swings in steam demand is essentially eliminated. This results in a high degree of stability of boiler operation, and makes possible a high degree of system rigidity not otherwise obtainable.

It should also be noted that the use of the resultant reference signal described and illustrated herein essentially locks the various interconnected systems together and yet provides sufficient flexibility of interconnection to permit necessary shifts and adjustments to take place. This prevents the systems from being so rigidly interconnected as to make practical operation difficult or even impossible.

The modification of Fig. 6

In Fig. 6 we have illustrated a portion of a modification of the arrangement of Fig. 2 which is designed to use a different type of reference signal from that employed in the Fig. 2 arrangement. Specifically, the reference signal utilized in the arrangement of Fig. 6 is solely the system bus voltage signal for the system 300, as transmitted over the channel 313, instead of being the resultant of the bus voltage signals for each of the systems 100, 200, 300. Accordingly, there is no inter-system phase shifting device for the system 300 included in the Fig. 6 arrangement. To this end, the inter-system dispatcher's office 11 of Figs. 1 and 2 is replaced in Fig. 6 by an office 11' at which are located only the phase shifting devices 115 and 212 for the respective systems 100 and 200.

As shown, the system bus voltage signal of the system 300 is applied as the reference voltage signal to the inputs of the devices 115 and 212 by the channel 313. The input signals for the local phase shifting devices 316, 317, and 318 of the system 300 are obtained directly from the bus voltage signal on the channel 313. The equipment 14 may be utilized in the Fig. 6 arrangement in the same manner as that described in connection with the arrangement of Fig. 2.

The use of the signal from the system 300 in Fig. 6 has been made merely by way of example, and it is to be understood that either the signal from the bus of the system 100 or the signal from the bus of the system 200 could be employed in lieu of the signal from the system 300 if necessary or desirable. It may be found to be advantageous to utilize the Fig. 6 arrangements in lieu of that of Fig. 2 in those cases where conditions make it impractical or undesirable to obtain and/or utilize a resultant of the bus voltage signals for all of the systems involved.

The modification of Fig. 7

There is illustrated in Fig. 7 a portion of still another modification of the Fig. 2 arrangement which is operative to employ still a different form of reference signal for application to the inputs of the inter-system phase shifting devices. Accordingly, the reference signal applied to the inter-system dispatcher's office 11 in Fig. 7 is the output of a precision constant frequency oscillator 84. This oscillator may be of the same type as that included in the apparatus 14 of Fig. 2. The phase of the oscillator signal is the reference phase for the interconnected systems, and the frequency of the latter will be held equal to that of the oscillator signal. This arrangement can be utilized in lieu of those of Figs. 2 and 6 when conditions make it necessary or desirable to avoid the production and/or use of signals representative of the bus voltage phases of the systems involved. If desired, time comparison equipment may be included in the Fig. 7 arrangement for the same purposes as those for which such equipment is employed in the arrangements of Figs. 2 and 6.

Although use has been made of a single line form or representation for the various busses and tie lines shown throughout the several figures illustrating the present invention, it is to be understood that this representation is intended to cover the conventional multiconductor bus and line constructions and arrangements well known to those skilled in the art.

From the foregoing description, it should be evident that the novel phase angle control apparatus of the present invention is operative to provide a highly desirable form of interconnected system control characterized by the many operating advantages and features listed and described at the beginning of this description.

While, in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent is as follows:

1. Apparatus for controlling interconnected alternating current generating systems comprising circuit means adapted to be connected to a source of an alternating current reference signal, a separate phase responsive control device associated with at least one of the generating stations of each of a plurality of interconnected alternating current generating systems to be controlled, each of said control devices being adapted to control the magnitude of the electrical power generated by the corresponding one of said stations in accordance with the magnitude and sign of the phase angle between two alternating current signals respectively applied to said control device, a plurality of adjustable station phase shifting devices, each of which is individual to a corresponding one of said stations, a plurality of adjustable system phase shifting devices, each of which is individual to a corresponding one of said systems, a connection between each of the control devices of each of said systems and the corresponding one of said system phase shifting devices, each of said connections including a corresponding one of said station phase shifting devices, a connection between each of said system phase shifting devices and said circuit means, whereby said reference signal is applied to each of said control devices through the corresponding one of said system and station phase shifting devices, and a separate conductor means connected to each of said control devices and adapted to apply thereto a signal having the phase of the output voltage of the corresponding station, each of said control devices being operative to regulate the power generated by the corresponding one of said stations in accordance with the phase angle between the signals applied to said control device as necessary to maintain said phase angle substantially constant at a predetermined value.

2. Apparatus as specified in claim 1, wherein there is included means connecting said circuit means to a point in a single one of said systems, and wherein the phase of said reference signal bears a known, fixed relationship to that of the voltage at said point.

3. Apparatus as specified in claim 1, wherein there is included means connecting said circuit means to a point in each of said systems, wherein said circuit means is operative to derive a separate alternating current system signal from each of said points and to combine said system signals to form said reference signal, and wherein the phase of each of said system signals bears a known, fixed relationship to that of the voltage at the corresponding one of said points.

4. Apparatus as specified in claim 1, wherein there is included a device which produces a signal having a precisely constant frequency equal to the desired frequency of the alternating current generated by said systems, and means connecting the last mentioned device to said circuit means for the application thereto of the last mentioned signal.

5. Apparatus as specified in claim 1, wherein there is included means connecting said circuit means to a point in each of said systems, wherein said circuit means is operative to derive a separate alternating current system signal from each of said points, wherein there is included a device which produces a standard frequency signal having a precisely constant frequency equal to the desired frequency of the alternating current generated by said systems and means connecting the last mentioned device to said circuit means for the application thereto of the last mentioned signal, wherein the phase of each of said system signals bears a known, fixed relationship to that of the voltage at the corresponding one of said points, and wherein said circuit means is operative to combine said system and standard frequency signals to form said reference signal.

6. Apparatus for controlling interconnected alternating current generating systems comprising first circuit means adapted to be connected to a source of an alternating current reference signal and adapted, when so connected, to derive therefrom an alternating current reference signal, second circuit means connected to said first circuit means and including a plurality of circuit branches, said second circuit means being operative to derive a plurality of alternating current control signals from said reference signal and to apply each of said control signals to a corresponding one of said circuit branches, at least one adjustable phase shifting device connected in a corresponding one of said circuit branches and operative to establish a phase angle between the corresponding one of said control signals and said reference signal which has a value determined by the adjustment of said device, a separate control device associated with at least one of the generating stations of each of a plurality of interconnected alternating current generating systems to be controlled, each of said control devices having an input portion and being adapted to control the magnitude of the electrical power generated by the corresponding one of said stations in accordance with the value of a control effect applied to said input portion, a separate phase comparator associated with each of said control devices, having an output circuit and two input circuits, and being operative to produce in said output circuit a control effect representative of the magnitude and sign of the phase angle between two alternating current signals respectively applied to said input circuits, means adapted to connect each of said circuit branches to one of the input circuits of a corresponding one of said phase comparators and to apply the corresponding one of said control signals to the last mentioned input circuit, conductor means connecting the remaining one of the input circuits of each of said phase comparators to the output bus of the corresponding one of said generating stations and operative to apply to the last mentioned input circuit an alternating current output signal representative of the phase of the voltage of said bus, and means operative to interconnect the output circuit of each of said phase comparators with the input portion of the associated one of said control devices and to apply the control effect produced by the last mentioned phase comparator to the last mentioned input portion, whereby each of said control devices is operative to regulate the power generated by the corresponding one of said stations in accordance with the phase angle between the corresponding one of said control signals and the corresponding one of said output signals as necessary to maintain said phase angle substantially constant at a predetermined value.

7. Apparatus as specified in claim 6, wherein there is included means connecting said first circuit means to a point in a single one of said systems, wherein said first circuit means is adapted to derive said reference signal from said point, and wherein the phase of said reference signal bears a known, fixed relationship to that of the voltage at said point.

8. Apparatus as specified in claim 6, wherein there are included separate means connecting said first circuit means to a point in each of said systems, wherein said first circuit means is adapted to derive an individual alternating current system signal from each of said points and is operative to combine said system signals to form said reference signal, and wherein the phase of each of said system signals bears a known, fixed relationship to that of the voltage at the corresponding one of said points.

9. Apparatus as specified in claim 6, wherein there is included a device which produces a signal having a precisely constant frequency equal to the desired frequency of the alternating current generated by said systems and means connecting the last mentioned device to said first circuit means, and wherein said first circuit means is adapted to derive said reference signal from said last mentioned device.

10. Apparatus as specified in claim 6, wherein there are included separate means connecting said first circuit means to a point in each of said systems, wherein said first circuit means is adapted to derive an individual alternating current system signal from each of said points, wherein there is included a device which produces a standard frequency signal having a precisely constant frequency equal to the desired frequency of the alternating current generated by said systems and means connecting the last mentioned device to said first circuit means for the application thereto of the last mentioned signal, wherein the phase of each of said system signals bears a known, fixed relationship to that of the voltage at the corresponding one of said points, and wherein said first circuit means is operative to combine said system and standard frequency signals to form said reference signal.

11. Apparatus for controlling interconnected alternating current generating systems comprising first circuit means adapted to be connected to a source of an alternating current reference signal and adapted, when so connected, to derive therefrom an alternating current reference signal, second circuit means connected to said first circuit means and including a separate system circuit branch individual to each of a plurality of interconnected alternating current generating systems to be controlled, said second circuit means being operative to derive a plurality of alternating current system control signals from said reference signal and to apply each of said system control signals to a corresponding one of said system circuit branches, at least one adjustable system phase shifting device connected in a corresponding one of said system circuit branches and operative to establish a phase angle between the corresponding one of said system control signals and said reference signal which has a value determined by the adjustment of said device, a separate circuit means connected to each of said system circuit branches and including a separate station circuit branch individual to each of the generating stations to be controlled within the corresponding one of said systems, each of said separate circuit means being operative to derive a plurality of alternating current station control signals from the corresponding one of said system control signals and to apply each of said station control signals to a corresponding one of said station circuit branches, at least one adjustable station phase shifting device connected in a corresponding one of said station circuit branches and operative to establish a phase angle between the corresponding one of said station control signals and said corresponding one of said system control signals which has a value determined by the adjustment of the last mentioned device, a separate control device associated with at least one of the generating stations of each of said alternating current generating systems to be controlled, each of said control devices having an input portion and being adapted to control the magnitude of the electrical power generated by the corresponding one of said stations in accordance with the value of a control effect applied to said input portion, a separate phase comparator associated with each of said control devices, having an output circuit and two input circuits, and being operative to produce in said output circuit a control effect representative of the magnitude and sign of the phase angle between two alternating current signals respectively applied to said input circuits, means adapted to connect each of said station circuit branches to one of the input circuits of a corresponding one of said phase comparators and to apply the corresponding one of said station control signals to the last mentioned input circuit, conductor means connecting the remaining one of the input circuits of each of said phase comparators to the output bus of the corresponding one of said generating stations and operative to apply to the last mentioned input circuit an alternating current output signal representative of the phase of the voltage of said bus, and means operative to interconnect the output circuit of each of said phase comparators with the input portion of the associated one of said control devices and to apply the control effect produced by the last mentioned phase comparator to the last mentioned input portion, whereby each of said control devices is operative to regulate the power generated by the corresponding one of said stations in accordance with the phase angle between the corresponding one of said station control signals and the corresponding one of said output signals as necessary to maintain said phase angle substantially constant at a predetermined value.

12. Apparatus as specified in claim 11, wherein there is included means connecting said first circuit means to a point in a single one of said systems, wherein said first circuit means is adapted to derive said reference signal from said point, and wherein the phase of said reference signal bears a known, fixed relationship to that of the voltage at said point.

13. Apparatus as specified in claim 11, wherein there are included separate means connecting said first circuit means to a point in each of said systems, wherein said first circuit means is adapted to derive an individual alternating current system signal from each of said points and is operative to combine said system signals to form said reference signal, and wherein the phase of each of said system signals bears a known, fixed relationship to that of the voltage at the corresponding one of said points.

14. Apparatus as specified in claim 11, wherein there is included a device which produces a signal having a precisely constant frequency equal to the desired frequency of the alternating current generated by said systems and means connecting the last mentioned device to said first circuit means, and wherein said first circuit means is adapted to derive said reference signal from said last mentioned device.

15. Apparatus as specified in claim 11, wherein there are included separate means connecting said first circuit means to a point in each of said systems, wherein said first circuit means is adapted to derive an individual alternating current system signal from each of said points, wherein there is included a device which produces a standard frequency signal having a precisely constant frequency equal to the desired frequency of the alternating current generated by said systems and means connecting the last mentioned device to said first circuit means for the application thereto of the last mentioned signal, wherein the phase of each of said system signals bears a known, fixed relationship to that of the voltage at the corresponding one of said points, and wherein said first circuit means is operative to combine said system and standard frequency signals to form said reference signal.

16. Apparatus for controlling interconnected alternating current generating stations comprising first circuit means adapted to be connected to a source of an alternating current reference signal and adapted, when so connected, to derive therefrom an alternating current reference signal, second circuit means connected to said first circuit means and including a plurality of circuit branches, said second circuit means being operative to derive a plurality of alternating current control signals from said reference signal and to apply each of said control signals to a corresponding one of said circuit branches, at least one adjustable phase shifting device connected in a corresponding one of said circuit branches and operative to establish a phase angle between the corresponding one of said control signals and said reference signal which has a value determined by the adjustment of said device, a separate control device associated with each of a plurality of interconnected alternating current generating stations to be controlled in an alternating current generating system, each of said control devices having an input portion and being adapted to control the magnitude of the electrical power generated by the corresponding one of said stations in accordance with the value of a control effect applied to said input portion, a separate phase comparator associated with each of said control devices, having an output circuit and two input circuits, and being operative to produce in said output circuit a control effect representative of the magnitude and sign of the phase angle between two alternating current signals respectively applied to said input circuits, means adapted to connect each of said circuit branches to one of the input circuits of a corresponding one of said phase comparators and to apply the corresponding one of said control signals to the last mentioned input circuit, conductor means connecting the remaining one of the input circuits of each of said phase comparators to the output bus of the corresponding one of said generating stations and operative to apply to the last mentioned input circuit an alternating current output signal representative of the phase of the voltage of said bus, and means operative to interconnect the output circuit of each of said phase comparators with the input portion of the associated one of said control devices and to apply the control effect produced by the last mentioned phase comparator to the last mentioned input portion, whereby each of said control devices is operative to regulate the power generated by the corresponding one of said stations in accordance with the phase angle between the corresponding one of said control signals and the corresponding one of said output signals as necessary to maintain said phase angle substantially constant at a predetermined value.

17. Apparatus as specified in claim 16, wherein there is included means connecting said first circuit means to a point in said system, wherein said first circuit means is adapted to derive said reference signal from said point, and wherein the phase of said reference signal bears a known, fixed relationship to that of the voltage at said point.

18. Apparatus as specified in claim 16, wherein there is included a device which produces a signal having a precisely constant frequency equal to the desired frequency of the alternating current generated by said stations and means connecting the last mentioned device to said first circuit means, and wherein said first circuit means is adapted to derive said reference signal from said last mentioned device.

19. Apparatus as specified in claim 16, wherein there is included means connecting said first circuit means to a point in said system, wherein said first circuit means is adapted to derive an alternating current system signal from said point, wherein there is included a device which produces a standard frequency signal having a precisely constant frequency equal to the desired frequency of the alternating current generated by said system and means connecting the last mentioned device to said first circuit means for the application thereto of the last mentioned signal, wherein the phase of said system signal bears a known, fixed relationship to that of the voltage at said point, and wherein said first circuit means is operative to combine said system and standard frequency signals to form said reference signal.

References Cited in the file of this patent

UNITED STATES PATENTS

| Number | Name | Date |
|---|---|---|
| 2,383,306 | Hanna et al. | Aug. 21, 1945 |